(12) United States Patent
Hosoda

(10) Patent No.: US 6,467,726 B1
(45) Date of Patent: Oct. 22, 2002

(54) AIRCRAFT AND TORQUE TRANSMISSION

(76) Inventor: Rokuro Hosoda, 29-13, Akatuka 1chome, Itabashi-ku, Tokyoto (JP)

( * ) Notice: Subject to any disclaimer, the term of this patent is extended or adjusted under 35 U.S.C. 154(b) by 67 days.

(21) Appl. No.: 09/605,411

(22) Filed: Jun. 28, 2000

(30) Foreign Application Priority Data

Jun. 29, 1999 (JP) ............................................ 11-182923

(51) Int. Cl.$^7$ .............................. B64C 27/28; F16H 3/50
(52) U.S. Cl. .......................... 244/60; 244/6; 244/12.3; 244/23 B; 180/337; 74/665 GB; 74/423 B
(58) Field of Search .............................. 244/60, 6, 7 R, 244/12.3, 17.19, 23 B; 180/337, 343; 74/665 F, 665 GB, 665 T, 423 B

(56) References Cited

U.S. PATENT DOCUMENTS

| | | | | |
|---|---|---|---|---|
| 2,464,285 A | * | 3/1949 | Andrews | 244/6 |
| 2,661,168 A | * | 12/1953 | Mortka | 244/6 |
| 4,632,337 A | * | 12/1986 | Moore | 244/60 |
| 4,730,795 A | * | 3/1988 | David | 244/6 |
| 5,823,470 A | * | 10/1998 | Craig et al. | 76/665 GB |

* cited by examiner

Primary Examiner—J. Woodrow Eldred
(74) Attorney, Agent, or Firm—Armstrong, Westerman, Hattori, McLeland & Naughton, LLP

(57) ABSTRACT

An aircraft including an airframe having a fuselage which extends longitudinally, and having fixed wings including a main wing, a horizontal tail wing and a vertical tail wing. A propeller-rotor torque transmission has a bevel gear which transmits the rotation of an input shaft simultaneously to a propeller shaft and to a rotor shaft. An engine gearbox supplies the above-mentioned input shaft with rotationalal motive power. The aircraft further includes a propeller collective pitch controller, a rotor collective pitch controller, an engine power controller which controls the output of the above-mentioned engine gearbox for the purpose of changing the rotational speed of the input shaft, and a flight control system having a directional (yaw) control system which controls the flight direction of the aircraft by controlling the positions of the above-mentioned control surfaces.

11 Claims, 34 Drawing Sheets

Fig. 15  Block Diagram (2)

Fig. 16 Block Diagram (3)

Fig. 33  Practical Example (1)
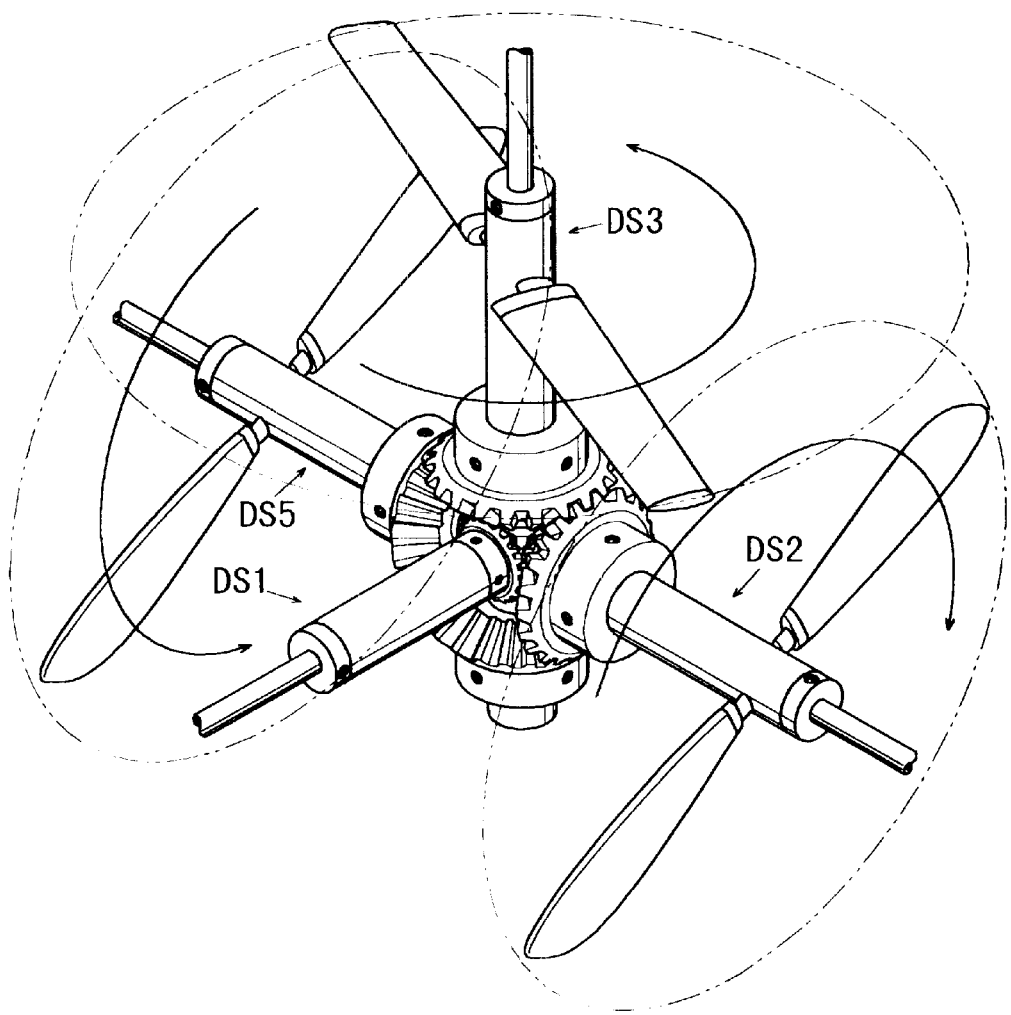

Fig. 34    Practical Example (2)
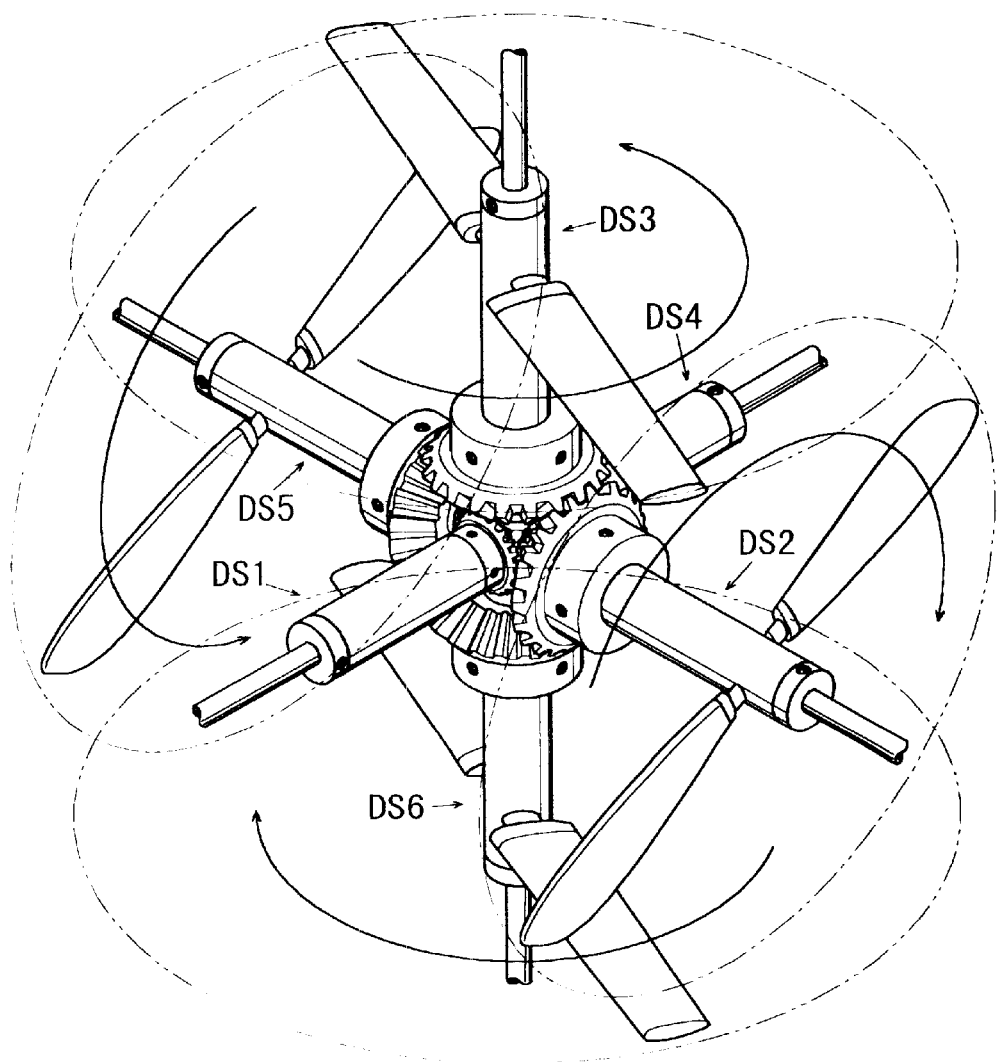

AIRCRAFT AND TORQUE TRANSMISSION

BACKGROUND OF THE INVENTION

1. Field of the Invention

The present invention relates to a vertical takeoff and landing aircraft or a short takeoff and landing aircraft (hereinafter referred to as a V/STOL aircraft as well) and to a torque transmission. The present invention may be favorably applied to an aircraft which uses bi-blade rotors and bi-blade variable pitch propellers.

2. Description of the Prior Art (a) As regards prior art V/STOL aircraft, prototypes of a number of tilt rotor aircraft have been manufactured since the 1950s. Typically, in the case of such an aircraft, wings equipped with propellers and engines is tilted with respect to the fuselage, or propellers equipped with engines are tilted, to direct the thrust upward, thereby performing vertical takeoff and landing similarly to helicopters. In the case of a prior art tilt rotor aircraft as mentioned above, flight is performed such that propellers equipped with engines are turned upward when a vertical takeoff or a vertical landing is made (in the helicopter mode) and propellers equipped with engines are turned forward when a level flight is made (in the fixed aircraft mode). The time required for the transition from the helicopter mode to the fixed wing mode or the other way around is more than ten-odd seconds, thus causing a problem in that the aircraft becomes very unstable during the transition.

(b) Prior art torque transmissions for VTOL aircraft serve to transmit engine output to propellers or rotors, but do not serve to transmit engine output simultaneously to propellers and rotors.

Propellers and rotors are prerequisites for realizing a VTOL aircraft capable of safely and easily switching from the helicopter mode to the fixed wing mode, as well as from the fixed wing mode to the helicopter mode.

For this purpose, it is necessary to have a simple torque transmission capable of transmitting engine output simultaneously to propellers and rotors. However, prior art torque transmissions cannot transmit engine output simultaneously to propellers and rotors.

DEFINITIONS OF TERMS (a) "Helicopter mode"

The helicopter mode is defined as a flight mode wherein an aircraft stays aloft by means of only the lift of rotors (i.e. the resultant of the lifts produced by rotors), with the lift of fixed wings equal to zero.

(b) "Fixed wing mode"

The fixed wing mode is defined as a flight mode wherein an aircraft flies by means of only the lift produced by fixed wings, with the lift of rotors equal to zero.

(c) "Compound mode"

The compound mode is defined as a flight mode wherein an aircraft flies by using the lift produced by rotors and the lift produced by fixed wings.

(d) "Rotor and rotor lift"

A rotor is defined as a member comprising:
a plurality of rotor blades producing a lift during rotation;
a rotor shaft supporting the above-mentioned rotor blades; and
a rotor lift is defined as the resultant of the lifts produced by a plurality of rotor blades.

OBJECT OF THE PRESENT INVENTION

The object of the present invention is, in view of the above-mentioned circumstances, to provide an aircraft and a torque transmission which are capable of resolving the problems stated in items (a) through (d) below.

(a) An aircraft which is capable of flying in the compound mode, wherein rotors and fixed wings produce a lift, in the helicopter mode, wherein only rotors produces a lift, and in the fixed wing mode, wherein only fixed wings produce a lift, shall be provided.

(b) An aircraft which has satisfactory stability and controllability both in the helicopter mode and in the fixed wing mode shall be provided.

(c) An aircraft which does not become unstable during transition either from the helicopter mode to the fixed wing mode or from the fixed wing mode to the helicopter mode shall be provided.

(d) A torque transmission, a bi-blade rotor, and a bi-blade propeller all of which may be favorably used on the above-mentioned aircraft shall be provided.

In the next place, the present invention, which was devised for the purpose of resolving the above-mentioned problems, is explained.

For the purpose of resolving the above-mentioned problems, an aircraft of the first aspect of the present invention comprises:

1. An aircraft comprising:
   (a) an airframe having,
      (1) a fuselage extending longitudinally,
      (2) a set of fixed wings consisting of a main wing and a horizontal tail wing both of which are connected to the above mentioned fuselage at two locations longitudinally apart from each other and both of which extend laterally and are capable of producing lifts during forward flight, and a vertical tail wing,
      (3) two ailerons one of which is installed on the right-hand section of the above mentioned main wing and the rest of which is installed in the left-hand section of the above mentioned main wing,
      (4) two elevators one of which is installed on the right-hand section of the above mentioned horizontal tail wing and the rest of which is installed in the left-hand section of the above mentioned horizontal tail wing, and
      (5) a rudder installed on the above mentioned vertical tail wing;
   (b) a propeller-rotor torque transmission having,
      (1) a shaft support coupler wherein
         one end each of a propeller shaft support and a rotor shaft support both of which lie at right angles to each other,
         and one end of an input shaft which lies at right angles to the above mentioned propeller shaft support and to the above mentioned rotor shaft support or which lies coaxially with either the above mentioned propeller shaft support or with the above mentioned rotor shaft support,
         are coupled together in such a way as to preclude rotation,
      (2) a cylindrical input shaft which is installed in such a way as to permit rotation around the above mentioned input shaft support,
      (3) a cylindrical propeller shaft which is installed in such a way as to permit rotation around the above mentioned propeller shaft support and on which a variable pitch propeller for producing a propelling force is installed,
      (4) a cylindrical rotor shaft which is installed in such a way as to permit rotation around the above mentioned rotor shaft support and on which is installed a rotor head that supports a rotor blade for producing a lift such that only the collective pitch is variable, and (5) a bevel gear which transmits the rotation of the above mentioned cylindrical input shaft (hereinafter referred to as an input shaft), simultaneously to the above mentioned cylindrical propeller shaft (hereinafter referred to as a propeller shaft), and to the above mentioned cylindrical rotor shaft (hereinafter referred to as a rotor shaft):

(c) an engine gearbox which supplies the above mentioned input shaft with rotational motive power; and (d) a flight control system having,
(1) a propeller collective pitch controller which controls the pitch angle of the above mentioned variable pitch propeller;
(2) a rotor collective pitch controller which controls the collective pitch of the above mentioned rotor blade;
(3) an engine power controller which controls the output of the above mentioned engine gearbox for the purpose of changing the rotational speed of the above mentioned input shaft; and
(4) a directional (yaw) control system which controls the deflection angles of the above mentioned ailerons and the above mentioned rudder to control the flight direction of the aircraft during forward flight.

The aircraft of the present invention may be provided with a plurality of propeller-rotor torque transmissions.

Namely, only one propeller-rotor torque transmission may be installed on the aircraft, for example, in the upper central section of the aircraft;

a total of two propeller-rotor torque transmissions may be installed on the aircraft, for example, one in the right-hand section of the aircraft and the other in the left-hand section of the aircraft;

a total of three propeller-rotor torque transmissions may be installed on the aircraft, for example, one in the right-hand section of the aircraft, another in the left-hand section of the aircraft, and a third at a location forward or aft of the above-mentioned right-hand and left-hand propeller-rotor torque transmissions; or a total of four propeller-rotor torque transmissions may be installed on the aircraft, for example, one in the right-hand section of the aircraft, another in the left-hand section of the aircraft, a third at a location forward of the above-mentioned right-hand and left-hand propeller-rotor torque transmissions, and a fourth at a location aft of the above-mentioned right-hand and left-hand propeller-rotor torque transmissions.

In a case where one propeller-rotor torque transmission is located in the right-hand section of an aircraft, and another propeller-rotor torque transmission is located in the left-hand section of the aircraft: each of the above-mentioned right-hand and left-hand propeller-rotor torque transmissions is referred to as a main propeller-rotor torque transmission;

a propeller rotated by a main propeller-rotor torque transmission is referred to as a main propeller; and a rotor rotated by a main propeller-rotor torque transmission is referred to as a main rotor.

In a case where a third propeller-rotor torque transmission is located at a position aft of the above-mentioned right-hand and left-hand propeller-rotor torque transmissions:

the above-mentioned aft propeller-rotor torque transmissions is referred to as a tail propeller-rotor torque transmission;

a propeller rotated by a tail propeller-rotor torque transmission is referred to as a tail propeller; and a rotor rotated by a tail propeller-rotor torque transmission is referred to as a tail rotor.

In a case where a main propeller-rotor torque transmissions is located in the right-hand section of the aircraft, another main propeller-rotor torque transmissions is located in the left-hand section of the aircraft, and a tail propeller-rotor torque transmission is located at a position aft of the above-mentioned two main propeller-rotor torque transmissions; the above-mentioned tail propeller-rotor torque transmission may be provided either with only a tail rotor for controlling the pitching of the aircraft or with only a tail propeller for performing directional (yaw) control of the aircraft.

It is possible to provide a plurality of engine gearboxes. For example, it is possible to realize a design such that two engine gearboxes are provided, one of which transmits rotation to two main propeller-rotor torque transmissions and the rest of which transmits rotation to two tail propeller-rotor torque transmissions.

According to the invention comprising the above-mentioned construction, the engine gearbox supplies the cylindrical input shafts with rotational motive power.

The rotation of the input shafts is transmitted simultaneously to the propeller shafts and the rotor shafts by the propeller-rotor torque transmissions. At this point, the propellers and the rotor blades rotate.

During takeoff of the aircraft, the pitch angles (blade angles) of the variable pitch propellers is brought to zero by means of the propeller collective pitch controller, and the collective pitch of the rotor blades is set to a high value.

Under these conditions, the propulsion force due to the propellers becomes zero, and the lift of the rotor blades becomes large. In this case, if the output of the engine gearbox is controlled by the engine power controller such that the rotational speed of the input shafts becomes high, then the aircraft climbs on account of the lift of the rotors while the lift of the fixed wing including the main wing and the horizontal tail wing is zero.

At this point, the aircraft flies in a flight mode wherein the aircraft stays aloft with the fixed wing lift equal to zero (helicopter mode).

If the pitch of the propellers is increased after the aircraft has climbed to the desired altitude, then the aircraft starts to travel forward. The forward flight of the aircraft causes the main wing and the horizontal tail wing to produce lift.

Therefore as the forward travel speed of the aircraft increases, the collective pitch of the rotor blades is decreased. At this point, the lift of the rotors decreases, but the aircraft can fly, since a sufficient lift is provided by the main wing and the horizontal tail wing.

After the lift of the rotors has become zero, the aircraft flies in a flight mode wherein the lift is provided only by the main wing and the horizontal tail wing (fixed wing mode).

In the fixed wing mode, the positions of the control surfaces are controlled to adjust the lift or the air resistance produced during forward flight.

The control surfaces, one of which is provided on each of the right-hand section and the left-hand section of the main wing, the right-hand section and the left-hand section of the horizontal tail wing, and the vertical tail wing serve to adjust the lifts produced by the right-hand section and the left-hand section of the main wing, the right-hand section and the left-hand section of the horizontal tail wing, and the vertical tail wing; and the air resistance produced during forward flight. Thereby making it possible to control the flight direction of the aircraft during forward flight.

In the case of the aircraft of the present invention, the flight mode transition from the helicopter mode to the fixed wing mode can be achieved, unlike the case with conventional aircraft, without performing tilting operation (propeller direction changing operation). Instead, this transition can be made only by changing the collective pitch of the rotor blades and by changing the pitch of the propellers. Therefore the pertinent transition of flight can be achieved safely.

The rotation mechanism and the pitch control mechanism for the rotor blades are simplified, since the rotor blades do not require cyclic control.

The aircraft of the present invention may provide the following advantages
(a) Since vertical takeoff and landing can be made in the helicopter mode, no large airfields are required, thus permitting takeoff from and landing on decks of ships.
(b) High-speed flight can be conducted in the fixed wing mode.
(c) When the load carried by the aircraft is too heavy for vertical takeoff and landing to be made in the helicopter mode, the aircraft may be used as an STOL aircraft.

For the purpose of resolving the above-mentioned problems, an aircraft of the second aspect comprises the components of the above-mentioned first aspect, wherein a number of components of the first aspect are further specified such that:
 (a) two the above mentioned propeller-rotor torque transmissions, one of which is located in the right-hand section of the above mentioned airframe, and, the rest of which is located in the left-hand section of the above mentioned airframe; and
 (b) a directional (yaw) control system which serves to independently control the pitch angles of each of variable pitch propellers of two the above mentioned propeller-rotor torque transmissions, thereby controlling the flight direction of the above mentioned aircraft.

In the case of the aircraft of the second invention comprising the above-mentioned construction, the directional (yaw) control system serves to controls the flight direction of the aircraft by independently controlling the pitch angles of the two main propellers one of which is located in the right-hand section of the aircraft and the rest of which is located in the left-hand section of the aircraft.

Namely, by bringing the pitch angle of the propeller installed on the right-hand (or left-hand) main propeller-rotor torque transmission to a higher value than the pitch angle of the propeller installed on the left-hand (or right-hand) main propeller-rotor torque transmission, a yawing moment is created on the aircraft, thereby performing directional (yaw) control of the aircraft. This yaw control can also be performed in a flight mode wherein the aircraft has no forward speed (helicopter mode).

For the purpose of resolving the above-mentioned problems, an aircraft of the third aspect comprises the components of the above-mentioned first aspect, wherein a number of components of the first aspect are further specified such that,
 a first propeller-rotor torque transmission and a second propeller-rotor torque transmission each of which has a rotor shaft and two propeller shafts rotating at the same speed as the above mentioned rotor shafts are provided.

In the case of the aircraft of the third aspect comprising the above-mentioned construction, the two propellers on the first (or second) propeller-rotor torque transmission can be prevented from colliding with the blades of the rotor on the first (or second) propeller-rotor torque transmission even if the planes of rotation of the propellers on the first (or second) propeller-rotor torque transmission intermesh with the plane of rotation of the rotor on the first (or second) propeller-rotor torque transmission.

For the purpose of resolving the above-mentioned problems, a fourth aspect of the present invention comprises the components of the above-mentioned first aspect, except that:
 a bi-blade rotor is used in lieu of the above mentioned rotor having single blades, or a bi-blade variable pitch propeller is used in lieu of the above mentioned variable pitch propeller having a single blade.

In the case of the fourth aspect comprising the above-mentioned construction, wherein bi-blade rotors or bi-blade variable pitch propellers are used, the number of rotor blades or variable pitch propellers can be increased as compared with the case where neither bi-blade rotors nor bi-blade variable pitch propellers are used. Therefore, the radii of rotation of rotor blades or variable pitch propellers can be reduced, thereby permitting the size of the aircraft storage space to be diminished.

A torque transmission of the fifth aspect comprises:
 (a) a shaft support coupler whereto the end of each of a first drive shaft supports and a second drive shaft support, both of which lie at right angles to each other, and the end of a third drive shaft support are linked in such a way as to preclude rotation,
 (b) a third drive shaft support which lies at right angles to said first and second drive shaft support, or lies coaxially with said first or second drive shaft support, and is located on the other side of said shaft support coupler;
 (c) a first drive shaft, a second drive shaft, and a third drive shaft, all of which are cylindrical and are installed around said first through third drive shaft supports, respectively ; and
 (d) a torque transmission bevel gear train wherein at least one bevel gear is installed on each of said first through third drive shafts such that the rotation of one of said first through third drive shafts is transmitted simultaneously to the other drive shafts.

In the case of the invention of the torque transmission comprising the above-mentioned construction, if one of the above-mentioned first through third drive shafts is used as an input shaft, and if the other two drive shafts are used as output shafts, then either: both of the output shafts lie at right angles to the input shaft; or one of the output shafts lies at right angles to the input shaft, and the other output shaft is positioned coaxially with the input shaft and is located on the opposite side of the above-mentioned shaft support coupler.

A torque transmission of the sixth aspect comprises the components of the above-mentioned fifth invention, wherein a number of components of the fifth aspect are further specified such that:
 a torque transmission bevel gear train wherein
  a first small bevel gear and a first large bevel gear are installed on one of said first through third drive shafts;
  a second small bevel gear is installed on one of the drive shafts on which neither said first small bevel gear nor said first large bevel gear is installed; and a second large bevel gear is installed on the drive shaft on which no other drive bevel gear is installed; such that said first small bevel gear and said second small bevel gear mesh with each other; and said first large bevel gear and said second large bevel gear mesh with each other.

In the case of the torque transmission of the sixth aspect comprising the above-mentioned components, one of the above-mentioned first through third drive shafts may be used as an input shaft, and the two other drive shafts may be used as output shafts.

If the numbers of teeth of the bevel gears on the above-mentioned first through third drive shafts are chosen pertinently, then the rotational speeds of the first through third drive shafts can be made different from one another.

A torque transmission of the seventh aspect has three drive shafts all of which lie at right angles to one another.

A torque transmission of the eighth aspect has three drive shafts all of which lie on a plane.

A torque transmission of the ninth aspect differs from the fifth aspect in that:

(c) a fourth drive shaft support which lies coaxially with one of the three drive shafts consisting of said first through third drive shafts and is linked to the opposite side of said shaft support coupler in such a way as to preclude rotation; and (d) a fourth drive shaft which is installed on said fourth drive shaft support in such a way as to permit rotation and on which is installed a bevel gear that meshes with a bevel gear installed on one of the drive shafts each mounted on one of two drive shaft supports consisting of said three drive shaft supports less the drive shaft support lying with said fourth drive shaft support.

In the case of the torque transmission of the ninth aspect comprising the above-mentioned components, one of the above-mentioned four drive shafts may be used as an input shaft and the three other drive shafts may be used as output shafts.

A torque transmission of the tenth aspect differs from the ninth aspect in that:

(a) a fifth drive shaft support which lies coaxially with one of the four drive shafts consisting of said first through fourth drive shafts and is linked to the opposite side of said shaft support coupler in such a way as to preclude rotation; and (b) a fifth drive shaft which is installed on said fifth drive shaft support in such a way as to permit rotation and on which is installed a bevel gear that meshes with a bevel gear installed on one of the drive shafts each mounted on one of three drive shaft supports consisting of said four drive shaft supports less the drive shaft support lying coaxially with said fifth drive shaft support.

In the case of the torque transmission of the tenth aspect comprising the above-mentioned components, one of the above-mentioned five drive shafts may be used as an input shaft and the four other drive shafts may be used as output shafts.

A torque transmission of the eleventh aspect differs from the tenth aspect in that:

(a) a sixth drive shaft support which lies coaxially with one of the five drive shafts consisting of said first through fifth drive shafts and is linked to the opposite side of said shaft support coupler in such a way as to preclude rotation; and (b) a sixth drive shaft which is installed on said sixth drive shaft support in such a way as to permit rotation and on which is installed a bevel gear that meshes with a bevel gear installed on one of the drive shafts each mounted on one of four drive shaft supports consisting of said five drive shaft supports less the drive shaft support lying coaxially with said sixth drive shaft support.

In the case of the torque transmission of the eleventh aspect comprising the above-mentioned components, one of the above-mentioned six drive shafts may be used as an input shaft and the five other drive shafts may be used as output shafts.

BRIEF DESCRIPTION OF THE DRAWINGS

FIG. 33 is a drawing showing a practical example (1) of the torque transmission of the present invention.

FIG. 34 is a drawing showing a practical example (2) of the torque transmission of the present invention.

DESCRIPTION OF PREFERRED EMBODIMENTS

In the next place, embodiments of the present invention are described, reference being had to drawings. However, the present invention is not limited to the following embodiments.

Therefore depending on factors such as the intended use of the aircraft, it is possible to select a variety of combinations regarding the arrangement of aircraft components such as engine gearboxes, rotor blades, propellers, wings, torque transmissions, and fuel tanks, as well as the functioning of such components.

First Embodiment

Figure 1:
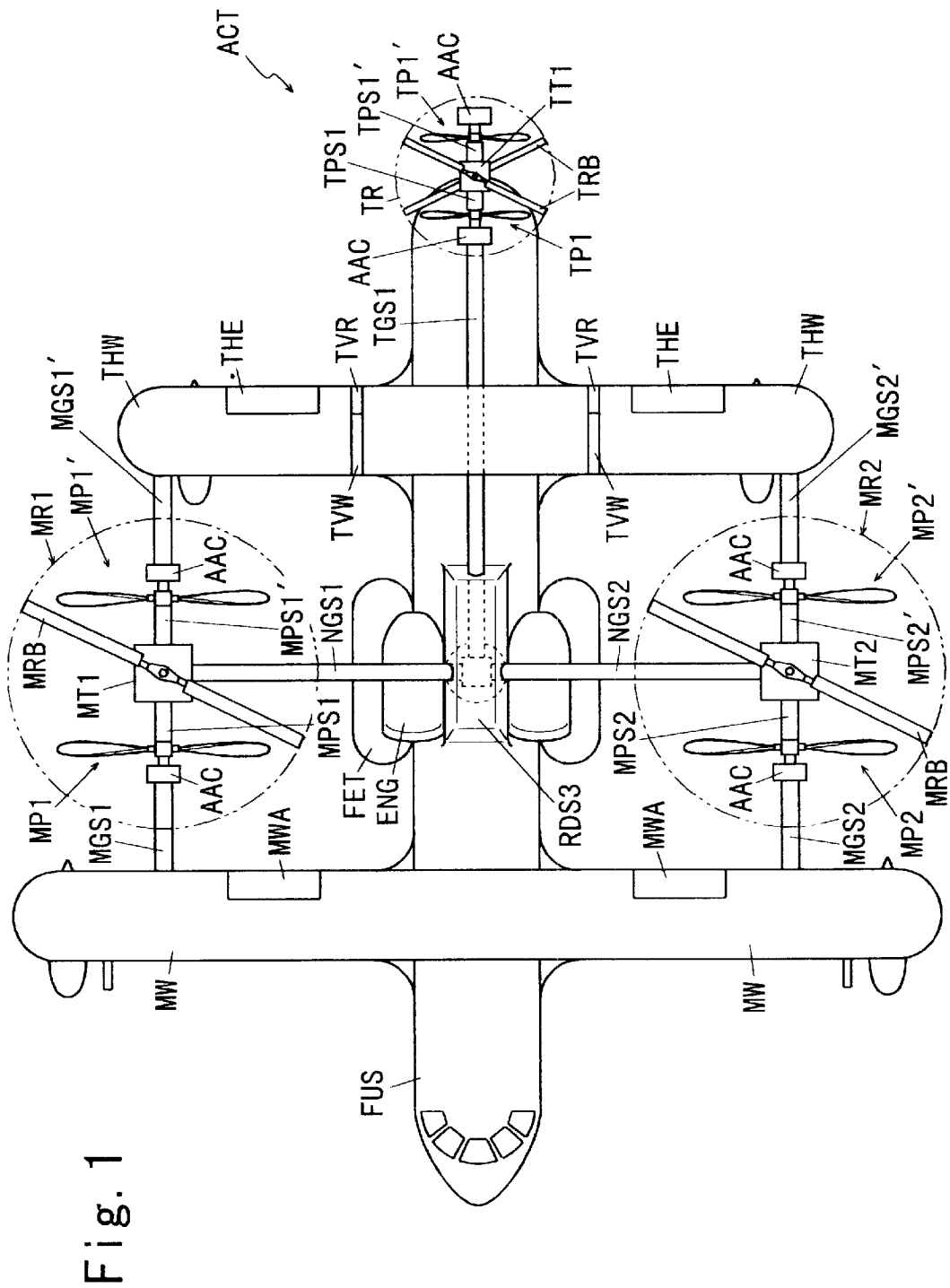
FIG. 1 is a plan view of an aircraft of the first embodiment.
Figure 2:
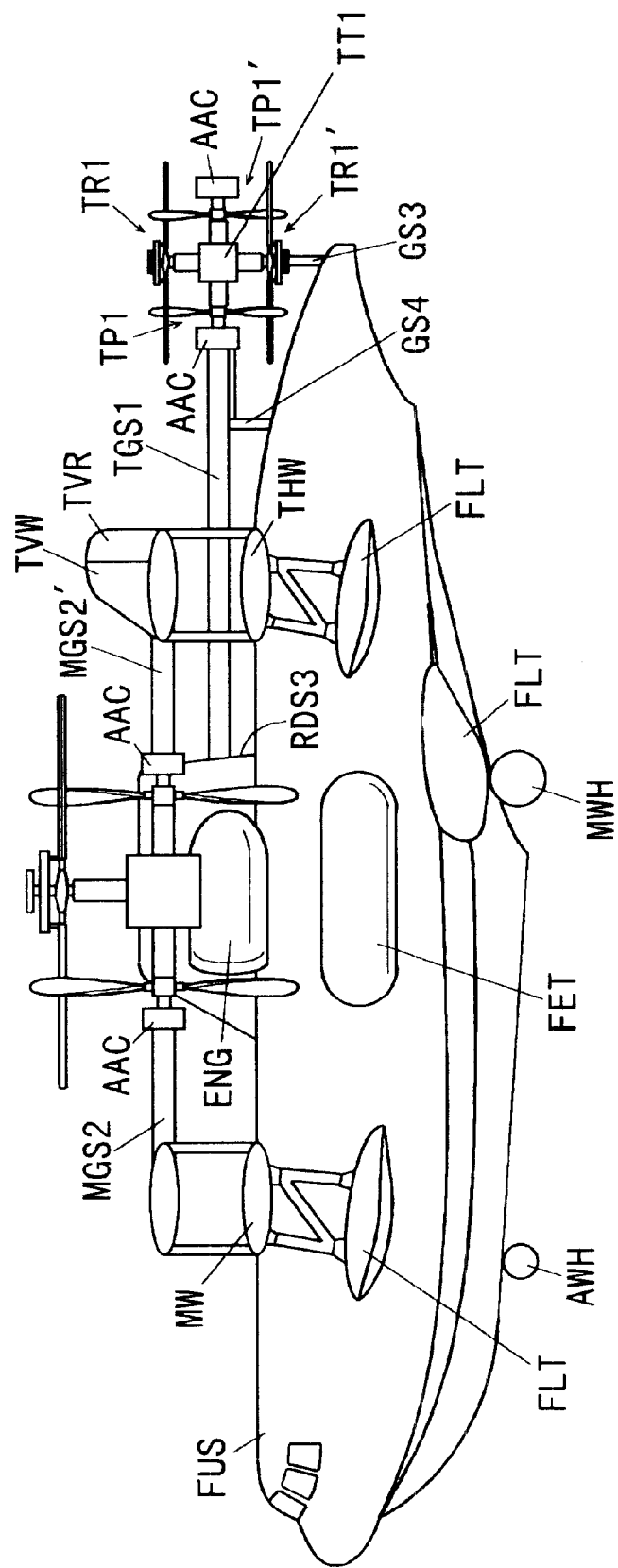
FIG. 2 is a side view of an aircraft of the first embodiment.
Figure 3:
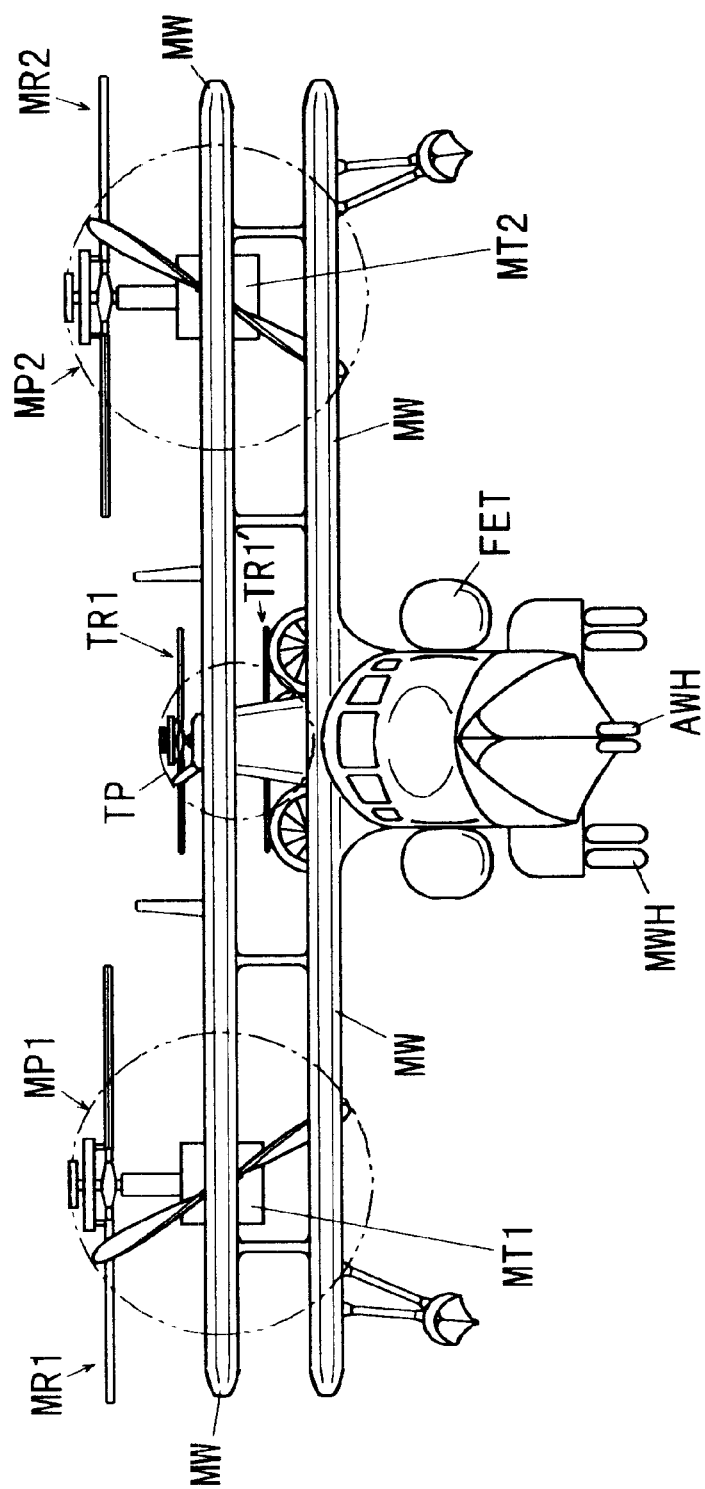
FIG. 3 is a front view of an aircraft of the first embodiment.

As shown in FIGS. 1 through 3, the aircraft of the first embodiment comprises:

a main wing MW which includes two ailerons MWA and is installed laterally in the fore part of a fuselage;

a horizontal tail wing THW which includes two horizontal tail elevators THE and is installed laterally in the rear part of the fuselage;

a vertical tail wing TVW which includes a vertical tail rudder TVR and is installed in the rear part of the fuselage;

a main rotor MR 1 and main propellers MP 1 and MP 1' all of which are installed on a main propeller-rotor torque transmission MT1 retained at a position between the right-hand section of the main wing MW and the right-hand section of the horizontal tail wing THW;

a main rotor MR 2 and a main propellers MP 2 and MP 2' all of which are installed on a main propeller-rotor torque transmission MT 2 retained at a position between the left-hand section of the main wing MW and the left-hand section of the horizontal tail wing THW; and tail rotors TR 1 and TR 1' and tail propellers TP 1 and TP 1' all of which are installed on a tail propeller-rotor torque transmission TT 1 retained in the rear part of the fuselage.

Figure 4:
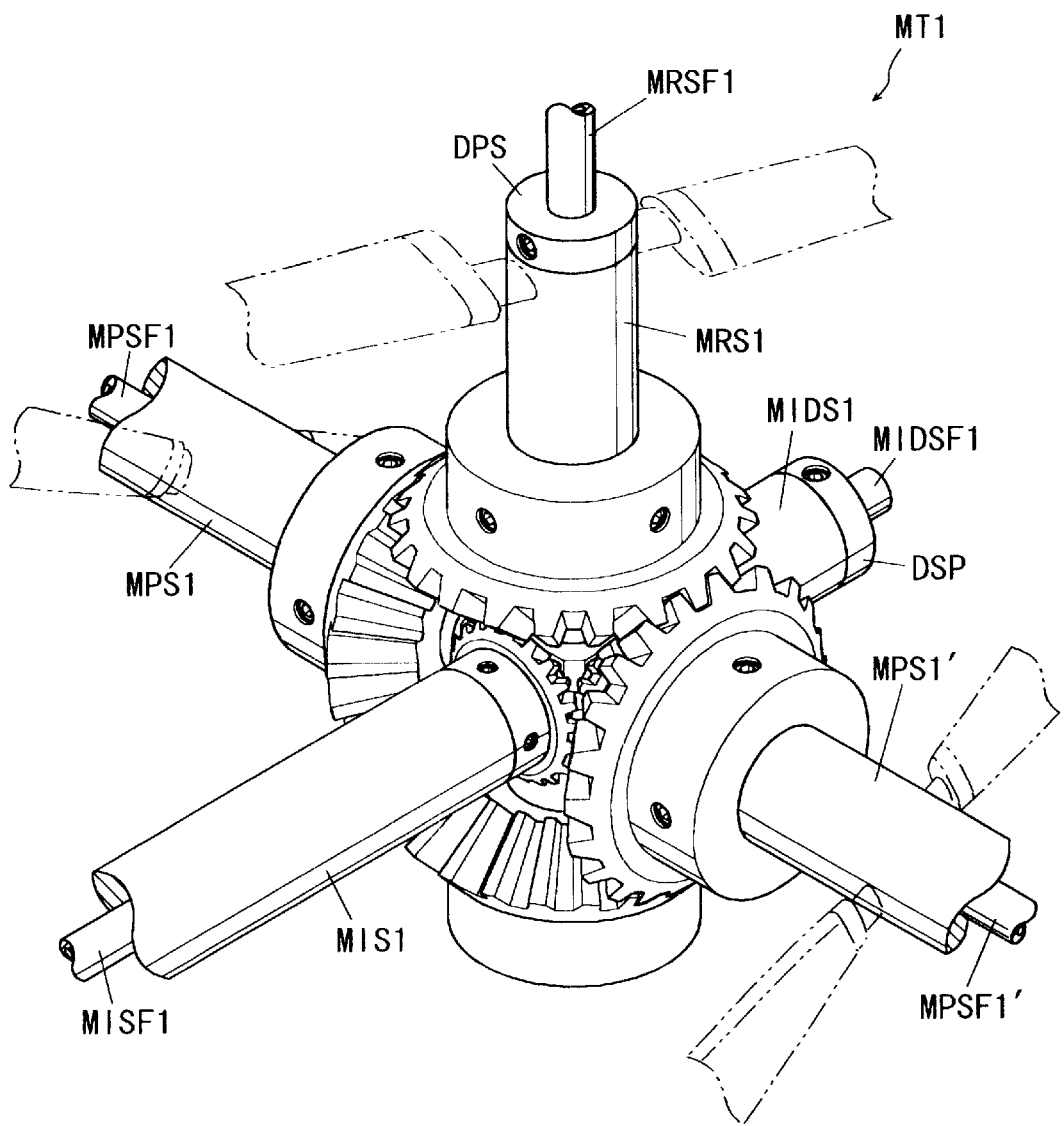
FIG. 4 is an explanatory drawing of the input shaft, the propeller shaft, the rotor shaft, the idling shaft, the input shaft support, the propeller shaft support, the rotor shaft support, and the idling shaft support, for the main propeller-rotor torque transmission of the first embodiment.

As shown in FIGS. 1 through 3, the casing MTG 1 for the main propeller-rotor torque transmission MT 1 (see FIGS. 5, 7, and 8) is retained to the right of the fuselage, between the main wing MW and the horizontal tail wing THW, by means of:

a main propeller shaft MPS1 supported by a propeller shaft support MPSF 1 (see FIG. 5) and a cylindrical shaft guard MGS1;

a main propeller shaft MPS 1' supported by a propeller shaft support MPSF 1' (see FIG. 5) and a cylindrical shaft guard MGS1'; and a main input shaft MIS 1 supported by a main input shaft support MISF 1 (see FIG. 4) and a cylindrical shaft guard NGS 1.

The casing MTG 2 for the main propeller-rotor torque transmission MT 2 is retained to the left of the fuselage, between the main wing MW and the horizontal tail wing THW, in a manner similar to the case of the above-mentioned casing MTG 1 for the main propeller-rotor torque transmission MT 1.

The casing TTG 1 for the tail propeller-rotor torque transmission TT 1 (see FIGS. 10 through 13) is retained at a position above the rear part of the fuselage by means of:

a tail rotor shaft TRS 1' supported by a tail rotor shaft support TRSF 1' (see FIG. 11) and a cylindrical shaft guard GS 3 extending upward from the rear part of the fuselage; and a tail rotor shaft TRS 1' supported by a cylindrical shaft guard GS 3 extending upward from the rear part of the fuselage; and a tail propeller shaft TPS 1 supported by a tail propeller shaft support TPSF 1 (see FIG. 12) and a cylindrical shaft guard TGS1.

A cylindrical shaft guard TGS 1 is retained by a cylindrical shaft guard GS 4 extending upward from the rear part of the fuselage.

The power from engines ENG 1 and ENG 2 both of which are mounted on the fuselage FUS is inputted into a gearbox RDS 3 by means of a gear system constructed on the basis of known technology, and is transmitted from the above-mentioned gearbox RDS 3 to the above-mentioned torque transmissions MT 1 and MT 2 via main input shafts MIS 1 and MIS 2, respectively, which are provided inside cylindrical shaft guards NGS 1 and NGS 2, respectively. At the same time, the above-mentioned power is transmitted to the tail propeller-rotor torque transmission TT1 by means of a tail propeller shaft TPS 1 provided inside a cylindrical shaft guard TGS 1.

The main rotors MR 1 and MR 2 shall be rotated in the opposite direction to each other for the purpose of neutralizing the torque applied on the aircraft.

The main propellers MP 1 and MP 1' shall be rotated in such a way as not to interfere with the blades of the main rotor MR 1.

The main propellers MP 2 and MP 2' shall be rotated in such a way as not to interfere with the blades of the main rotor MR 2.

For the purpose of meeting the above-mentioned requirements, when the main rotor MR 1 is rotated counterclockwise (as viewed down, this convention being applicable to main rotors and tail rotors):

the main rotor MR 2 is rotated clockwise, the main propeller MP 1 is rotated counterclockwise (as viewed forward, this convention being applicable to main propellers and tail propellers), the main propeller MP 1' is rotated clockwise, the main propeller MP 2 is rotated clockwise, and the main propeller MP 2' is rotated counterclockwise.

The tail propellers TP 1 and TP 1' shall be rotated in the opposite direction to each other for the purpose of neutralizing the torque applied on the aircraft.

The blades of the tail rotors TR 1 and TR 1' shall be rotated in such a way as not to interfere the with tail propellers TP 1 and TP 1', respectively.

The direction of rotation of the tail propeller TP 1 depends on the design of the engine gearbox RDS 3, and is irrelevant to the direction of rotation of the main propeller MP 1 or MP 2.

Therefore when the tail propeller TP1 is rotated counterclockwise the tail propeller TP 1' is rotated clockwise, the tail rotor TR 1 is rotated counterclockwise, and the tail rotor TR 1' is rotated clockwise.

In cases where the tip path plane of any propeller intermeshes with the tip path plane of any rotor, the rotation of the pertinent propeller is synchronized with the rotation of the pertinent rotor.

The shape of the lower part of the fuselage of the aircraft of the first embodiment is similar to that of a seaplane. However, the above-mentioned shape is not adhered to.

Figure 7:
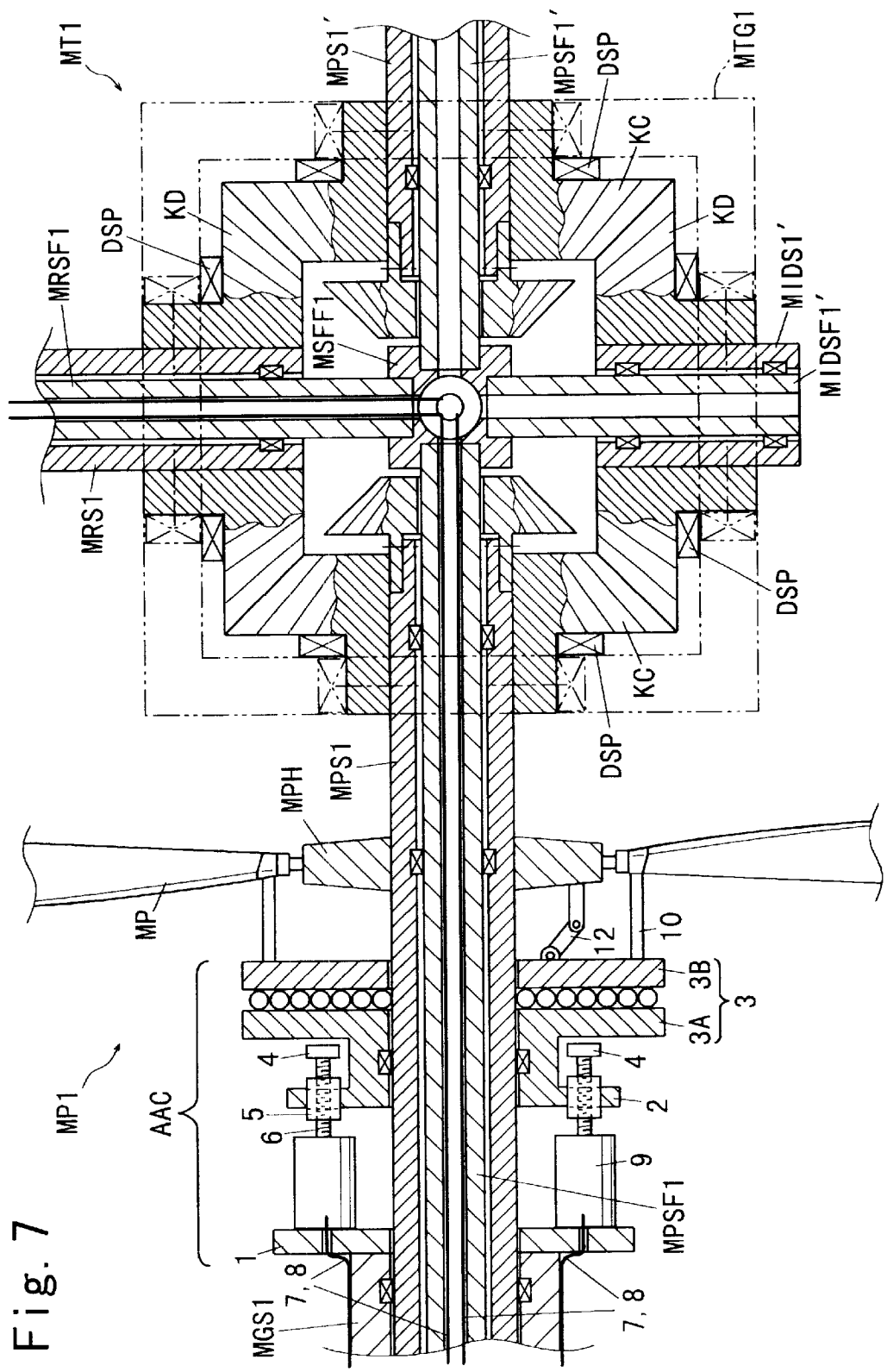
FIG. 7 is a sectional view showing the details of the main propeller-rotor torque transmission and the MP1 main propeller, both of which are components shown in FIG. 1.
Figure 8:
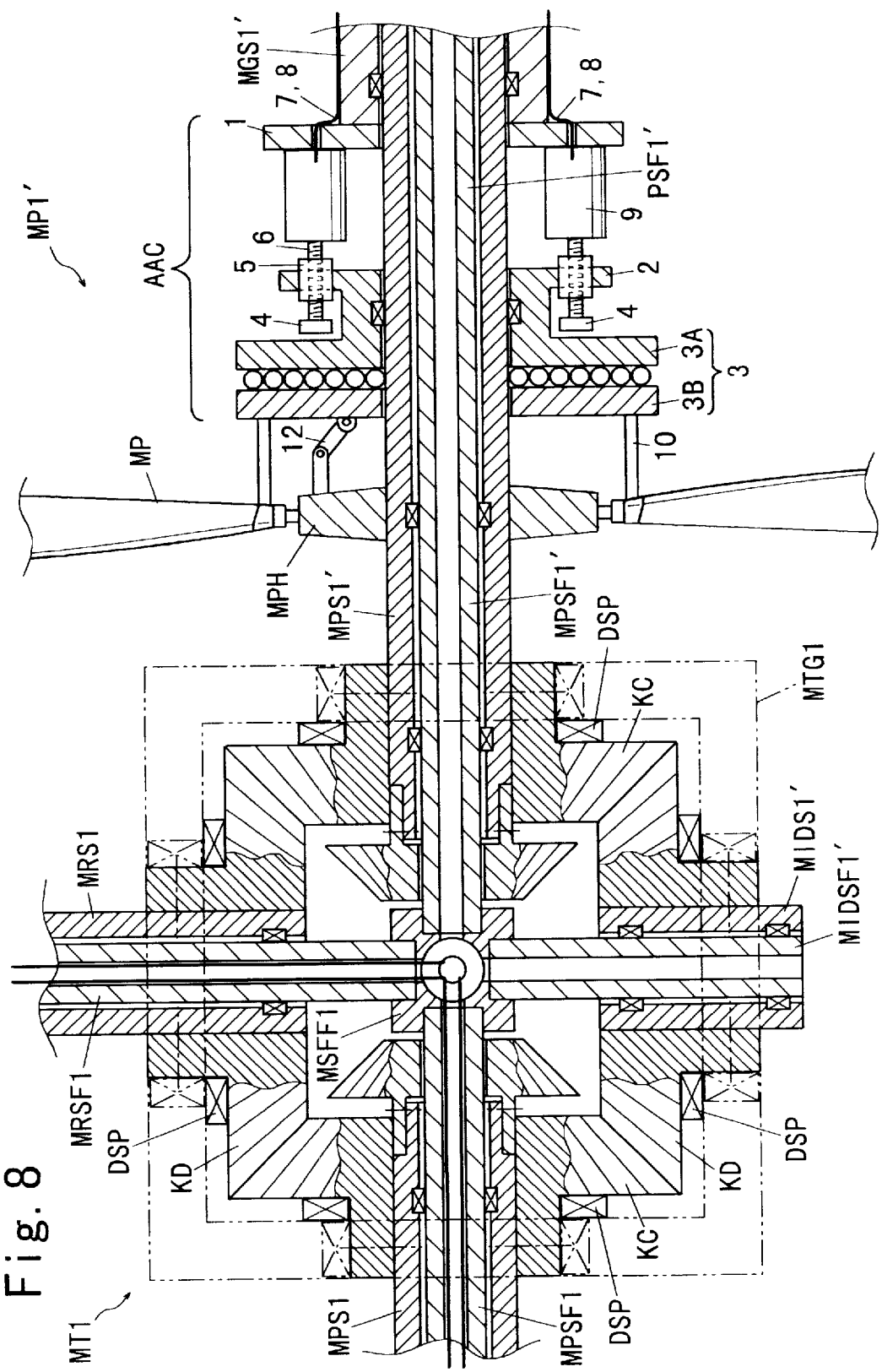
FIG. 8 is a sectional view showing the details of the main propeller-rotor torque transmission and the MP1' main propeller, both of which are components shown in FIG. 1.
Figure 9:
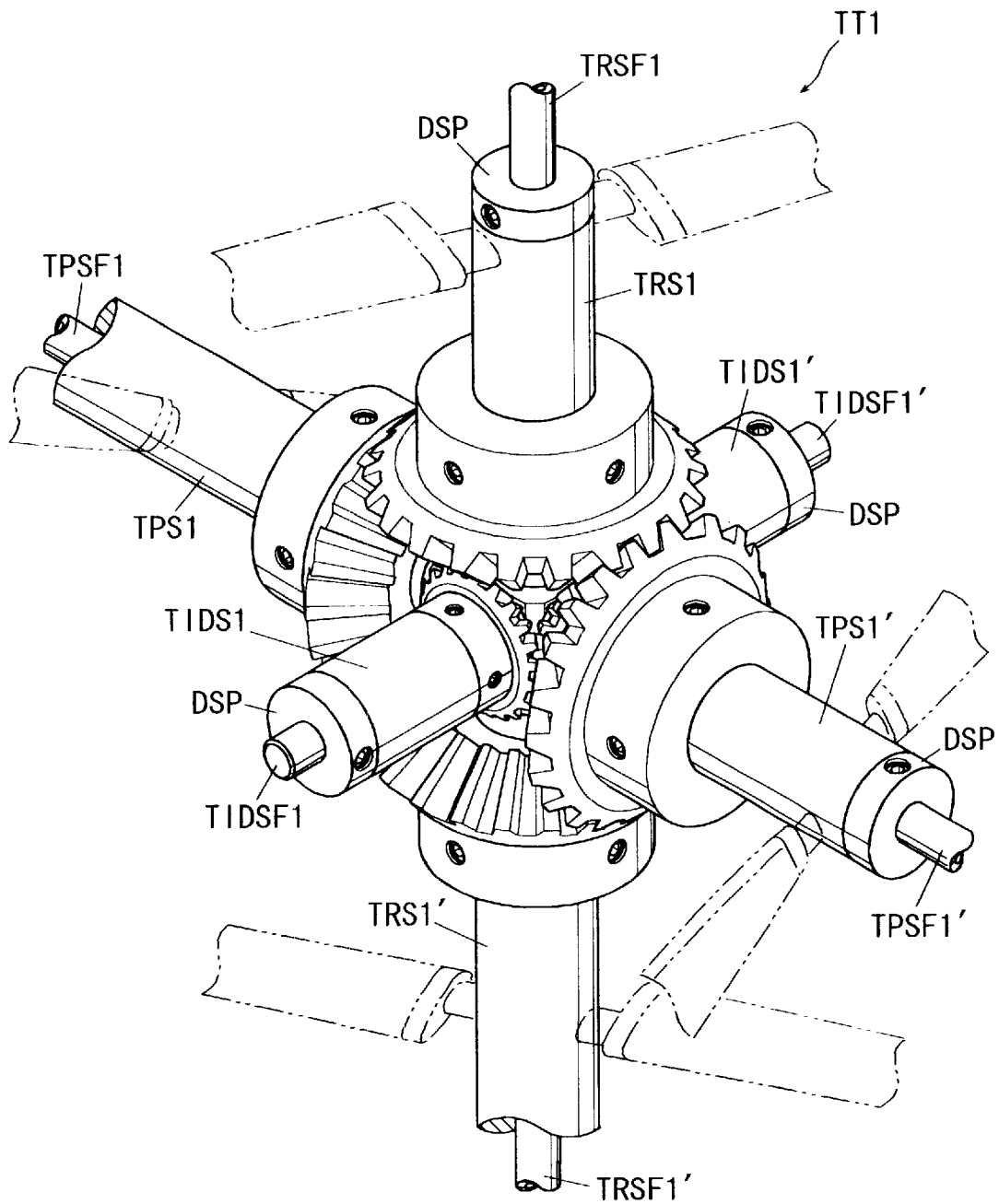
FIG. 9 is an explanatory drawing of the input shaft, the propeller shaft, the rotor shaft, the idling shaft, the input shaft support, the propeller shaft support, the rotor shaft support, and the idling shaft support, for the tail propeller-rotor torque transmission of the first embodiment.

Wires 7 for servomotor drive and wires 8 for servomotor control for changing the pitch angles of the propeller blades and the rotor blades are routed, depending on the type of arrangement of the propellers and the rotors, either through the main rotor shaft support MRSF 1, which does not rotate, (see FIGS. 5, 7, and 8), or through outside components such as cylindrical shaft guards MGS, NGS, and GS, which also serve as covers for an input shafts and output shafts, (see FIGS. 7 and 8).

Description of Torque Transmission MT 1 and MT 2

As shown in FIGS. 4 through 8, the main propeller-rotor torque transmission MT 1 is equipped with:

an input shaft MIS 1, and a main rotor shaft MRS 1 and a main propeller shaft MSP 1 both of which serve as output shafts.

The input shaft MIS 1 is supported by the main input shaft MISF 1; the main rotor shaft MRS 1 is supported by the main rotor shaft support MRSF 1; the main propeller shaft MPS 1 is supported by the main propeller shaft support MPSF 1; and the main propeller shaft MPS 1' is supported by the main propeller shaft support MPSF 1'.

One end of each of the hollow shafts MISF 1, MRSF 1, MPSF 1, and MPSF 1', all of which support the above-mentioned drive shafts MIS 1, MRS 1, MPS 1, and MPS 1', respectively, is linked to a main propeller-rotor shaft coupler MSFF1 in such a way as to preclude rotation.

Figure 5:
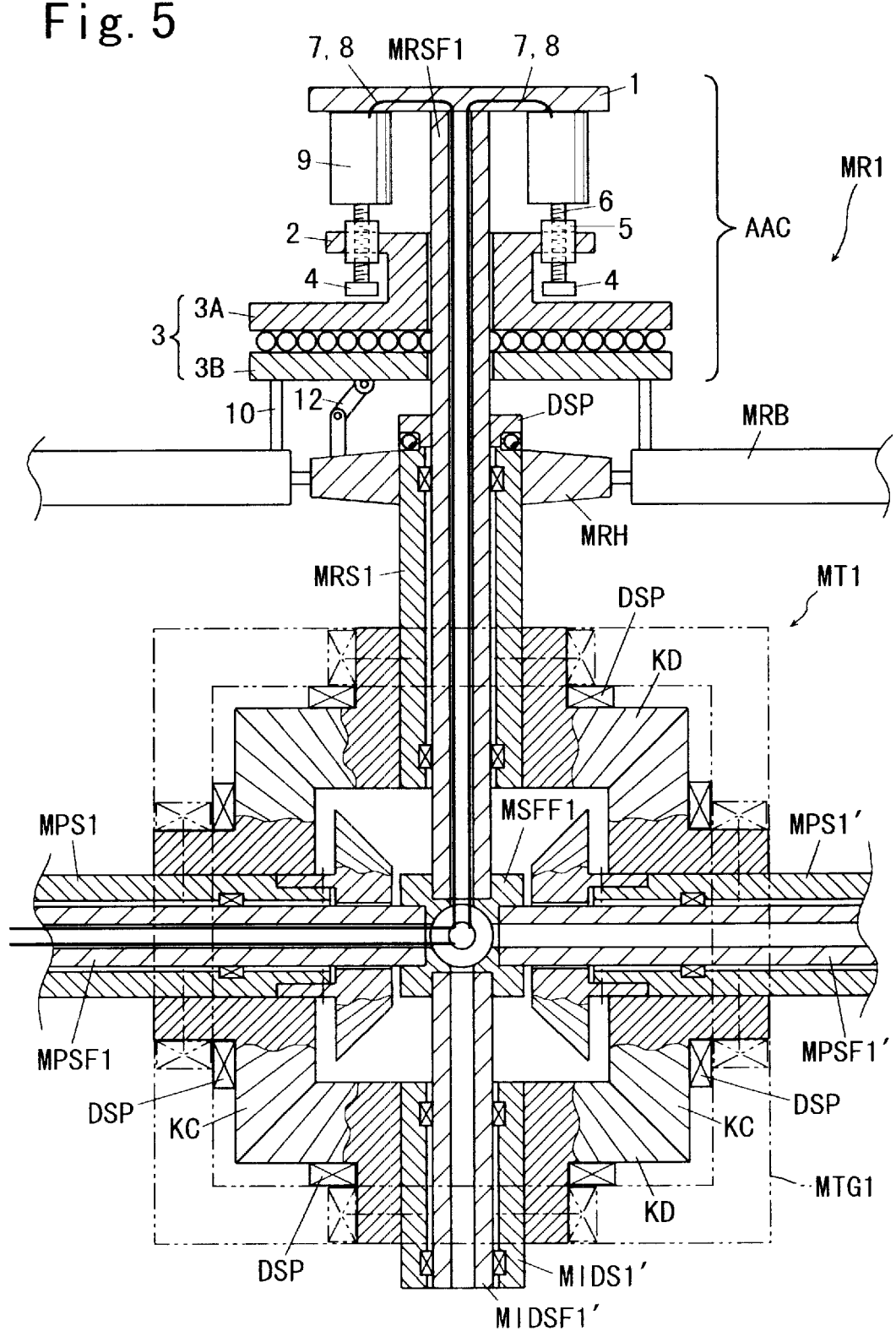
FIG. 5 is a sectional view showing the details of the main propeller-rotor torque transmission and the MR1 main rotor, both of which are components shown in FIG. 1.
Figure 6:
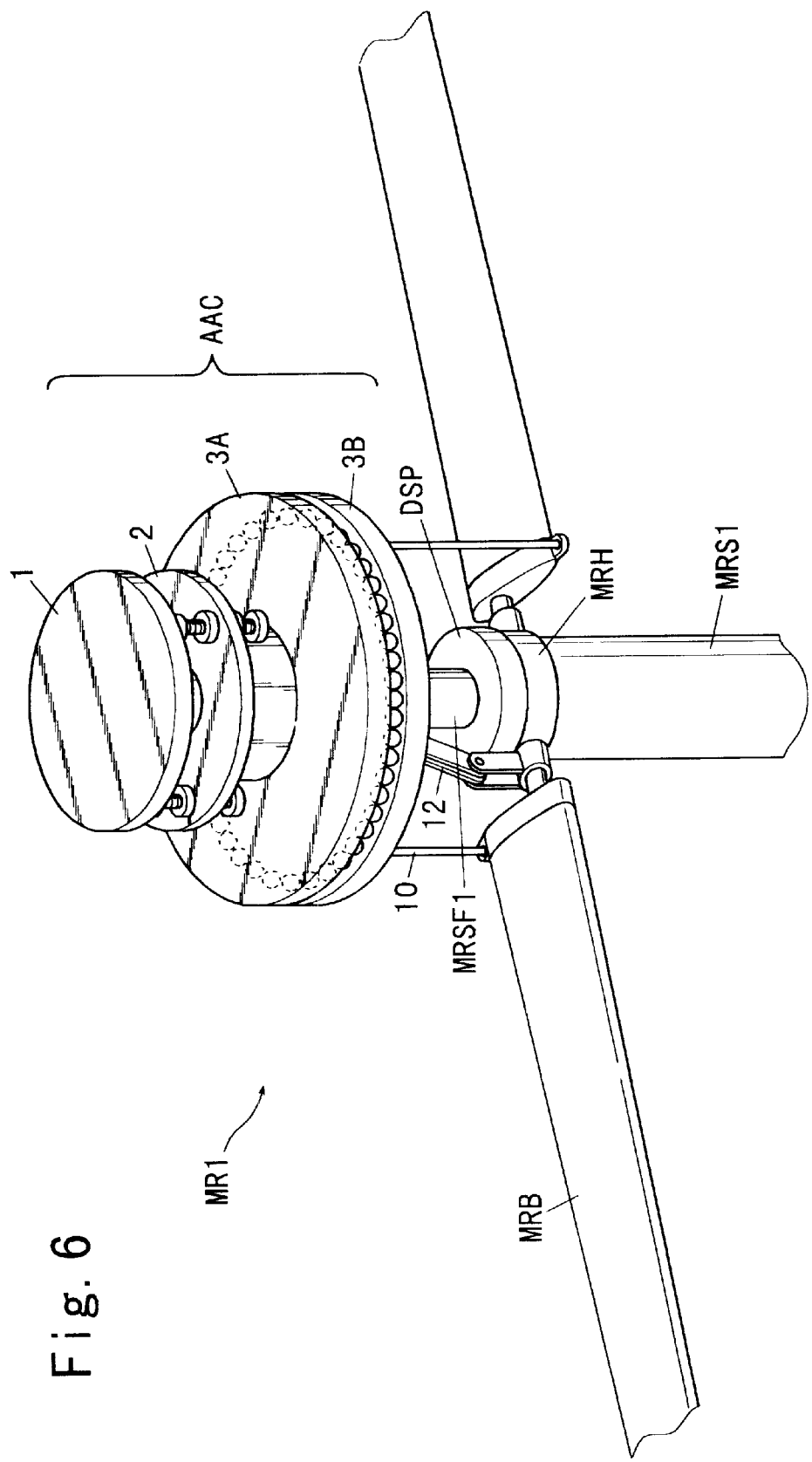
FIG. 6 is an explanatory drawing of the main rotor shown in FIG. 1.

As shown in FIGS. 5 and 6, the main rotor MR 1 is installed at the tip of the above-mentioned main rotor shaft MRS 1.

The main rotor MR 1 comprises a main rotor head MRH, a plurality of main rotor blades MRB, a swash plate 3, and a blade pitch angle controller AAC.

In order change the pitch angle of the main rotor blade MRB, the swash plate 3 is used.

The swash plate 3 consists of a stationary swash plate 3A and a rotating swash plate 3B.

The stationary swash plate 3A of the swash plate 3 is raised or lowered by a pitch control servomotor (stepping motor) 9 or by a pitch link 10.

If the main rotor head MRH rotates, then rotating scissors 12 and the rotating swash plate 3B of the swash plate 3 rotate as well, since the rotating swash plate 3B of the swash plate 3 is linked to the rotor head MRH by means of the rotating scissors 12.

In the case of an ordinary helicopter, forward flight can be carried out by changing the collective pitch and the cyclic pitch by means of a swash plate.

On the other hand, as regards the aircraft of the present invention, flight can be carried out only by changing the collective pitch of the rotor blades and the propeller blades.

In order to carry out stable forward flight, a cyclic pitch control mechanism may be added to the swash plate of an aircraft of the present invention.

A stop DSP for the main rotor shaft MRS 1 and a blade pitch angle controller AAC are installed at the end of the main rotor shaft support MRSF 1.

The blade pitch angle controller AAC comprises:

a first stand 1 installed at the end of the above-mentioned main rotor shaft support MRSF 1;

a second stand 2 which moves by means of a pitch servomotor 9 installed on the first stand 1;

a swash plate 3 including a stationary swash plate 3A and a rotating swash plate 3B; and a pitch link 10 installed between the rotating swash plate 3B and the main rotor blade MRB.

A female screw 5 and a male screw 6 engaging with the female screw 5 are installed on the second stand 2. If the male screw 6 is rotated by the above mentioned servomotor 9 installed on the first stand 1, then the second stand 2 moves along the male screw 6 toward the first stand 1 fixed on the above-mentioned main rotor shaft support MRSF 1.

The second stand 2 and the stationary swash plate 3A are fixed together. Therefore if the second stand 2 moves along the male screw 6 toward the first stand 1, then the stationary swash plate 3A and the rotating swash plate 3B move along the male screw 6 toward the first stand 1.

As shown in FIGS. 5 and 6, a pitch link 10 is installed between the rotating swash plate 3B and the main rotor blade MRB.

If the rotating swash plate 3B travels along the male screw 6 toward the first stand 1, then the pitch link 10 also travels along the male screw 6 toward the first stand 1, thereby changing the pitch angle (collective pitch) of the main rotor blade MRB.

Since the travel of the second stand 2 can be limited by the stop 4, the angle of attack of the main rotor blade MRB can be brought to a value not exceeding the angle of stall.

The wires 7 for servomotor drive and the wires 8 for servomotor control (see FIG. 5), all of which are routed from the cockpit via the main wing MW to send driving current and control signals to the blade pitch angle controller AAC for the above-mentioned main rotor MR 1, are routed in the interior of the main propeller shaft support MPSF 1 for the main propeller shaft located inside the shaft guard MGS 1, and are introduced into the blade pitch angle controller AAC for the main rotor MR 1 via the interior of the main propeller-rotor shaft support coupler MSFF 1 for the torque transmission MT and via the interior of the main rotor shaft support MRSF 1.

As shown in FIGS. 7 and 8, the main propellers MP 1 and MP 1' are installed on the main propeller shafts MPS 1 and MPS 1', respectively.

The principle of the pitch angle controller AAC for the main rotor blade MRB, wherein the above-mentioned swash plate 3 is used, may be applied to controlling the pitch angles of the main propellers MP 1 and MP 1'.

Namely, as shown in FIGS. 7 and 8:

a swash plate 3 may be installed at the end of each of the shaft guards MGS 1 and MGS 1';

the axial travel of the stationary swash plate 3A may be controlled by means of the pitch control servomotor 9; and the rotation of the main propellers MP 1 and MP 1' may be synchronized with the rotation of the rotating main propeller swash plate 3B by means of the pitch link 10;

thereby controlling the pitch angles of the main propellers MP 1 and MP '1.

The wires 7 for servomotor drive and the wires 8 for servomotor control (see FIG. 7), all of which are routed from the cockpit via the main wing MW to send driving current and control signals to the blade pitch angle controller AAC for above-mentioned main propeller MP 1, are routed on the exterior of the shaft guard MGS 1 and are introduced into the blade pitch angle controller AAC for the main propeller MP 1.

The wires 7 for servomotor drive and the wires 8 (see FIG. 8) for servomotor control (see FIG. 8), all of which are routed from the cockpit via the horizontal tail wing THW to send driving current and control signals to the blade pitch angle controller AAC for the main propeller MP 1', are routed on the exterior of the shaft guard MGS 1' and are introduced into the blade pitch angle controller AAC for the main propeller MP 1'.

The principle of variable pitch propeller control may be applied to controlling the pitch angles of the main propeller blades.

The main propeller-rotor torque transmission MT 2 is constructed similarly to the above-mentioned main propeller-rotor torque transmission MT 1.

A comparison of the corresponding components of the main propeller-rotor torque transmissions MT 1 and MT 2 is shown in Table 1. Each component of the main propeller-rotor torque transmission MT 2 as given in column [A] of Table 1 corresponds to that component of the main propeller-rotor torque transmission MT 1 which is given in column [B] and is in the same row as the one in which the pertinent component of the main propeller-rotor torque transmission MT 2 is entered.

TABLE 1

LIST OF COMPARISON OF CORRESPONDING COMPONENTS OF PROPELLER-ROTOR TORQUE TRANSMISSIONS MT 1 AND MT 2

|  | [A] | [B] |
| --- | --- | --- |
| Main propeller-rotor torque transmission | MT 2 | MT 1 |
| Input shaft | MIS 2 | MIS 1 |
| Input shaft support | MISF 2 | MISF 1 |
| Main propeller shaft | MPS 2 | MPS 1 |
|  | MPS 2' | MPS 1' |

TABLE 1-continued

LIST OF COMPARISON OF CORRESPONDING COMPONENTS OF PROPELLER-ROTOR TORQUE TRANSMISSIONS MT 1 AND MT 2

|  | [A] | [B] |
| --- | --- | --- |
| Main propeller shaft support | MPSF 2 | MPSF 1 |
|  | MPSF 2' | MPSF 1' |
| Main rotor shaft | MRS 2 | MRS 1 |
| Main rotor shaft support | MRSF 2 | MRSF 1 |
| Idling shaft | MIDS 2 | MIDS 1 |
|  | MIDS 2' | MIDS 1' |
| Idling shaft support | MIDSF 2 | MIDSF 1 |
|  | MIDSF 2' | MIDSF 1' |

Description of Tail Propeller-Rotor TT 1

As shown in FIGS. 9 through 13, the tail propeller-rotor TT 1 comprises:

tail rotor shafts TRS 1 and TRS 1' serving as output shafts;

tail propeller shafts TPS 1 and TPS 1'; and idling shafts TIDS 1 and TIDS 1';

whereby the above-mentioned tail propeller shafts TPS 1 serves also as an input shaft.

The tail rotor shafts TRS 1 and TRS 1' are supported by the tail rotor shaft supports TRQF 1 and TRSF 1' respectively The tail propeller shafts TPS 1 and TPS 1' are supported by the tail propeller shaft supports TPSF 1 and TPSF 1', respectively.

The idling shafts TIDS 1 and TIDS 1', are supported by the idling shaft supports TIDSF 1 and TIDSF 1', respectively.

One end of each of the above-mentioned hollow shaft supports TRSF 1, TRSF 1' TPS 1, TPS 1', TISDF 1, and TIDSF 1', all of which support the tail rotor shafts TRS 1 and TRS 1', the tail propeller shafts TPS 1 and TPS1', the tail idling shafts TIDS1 and TID1', respectively, is linked to the tail propeller-rotor shaft support TSFF1 in such away as to preclude rotation.

Blade MRB, wherein a swash plate is used, may be applied to controlling the pitch angles of the tail rotor blades TRB.

Figure 10:
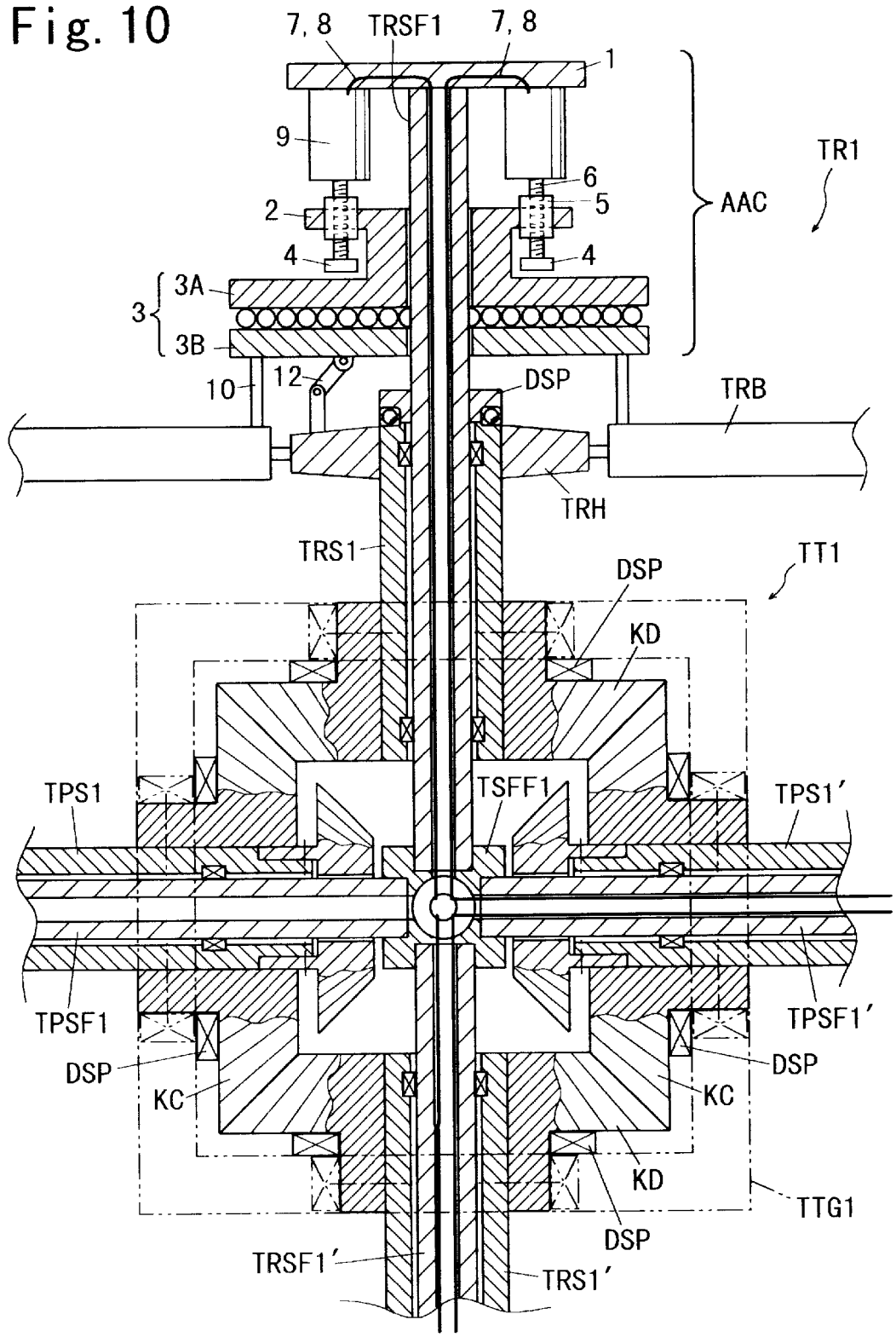
FIG. 10 is a sectional view showing the details of the tail propeller rotor-rotor torque transmission and the TR1 tail rotor, both of which are components shown in FIG. 2.
Figure 11:
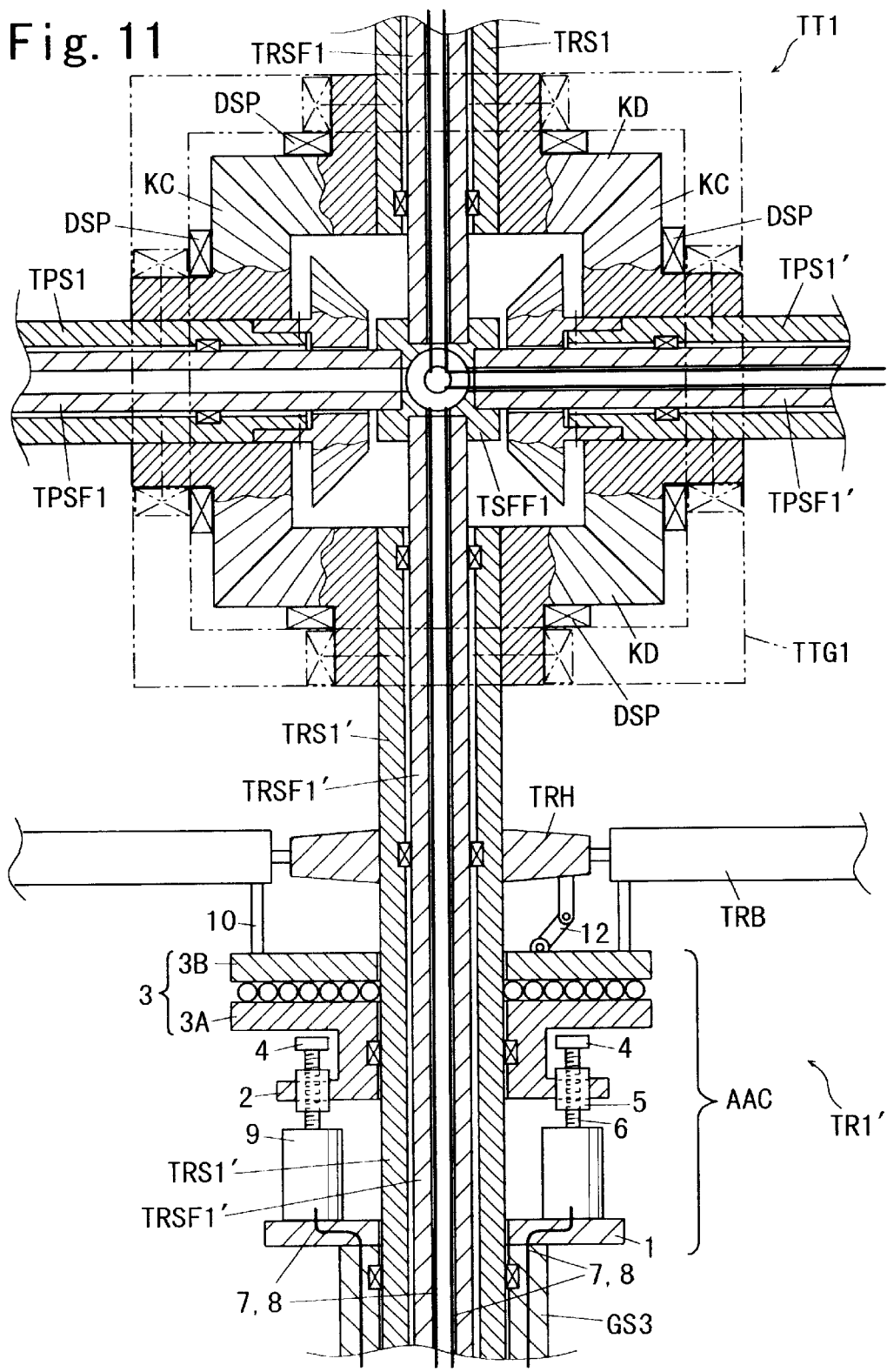
FIG. 11 is a sectional view showing the details of the tail propeller rotor-rotor torque transmission and the TR1' tail rotor, both of which are components shown in FIG. 2.

As shown in FIGS. 10 and 11, the tail rotor TR 1 is installed at the tip of the tail rotor shaft TRS 1, and the tail rotor TR 1' is installed on the tail rotor shaft TRS 1'.

The principle of the above-mentioned pitch angle controller AAC for the main rotor.

The wires 7 for servomotor drive and the wires 8 for servomotor control (see FIG. 10), all of which are routed from the cockpit to send driving current and control signals to the blade pitch angle controller AAC for the above-mentioned tail rotor TR 1, are routed in the interior of the tail rotor shaft support TRSF 1', and are introduced into the blade pitch angle controller AAC for the tail rotor TR 1 via the hollow portion of the tail propeller-rotor shaft support coupler TSFF 1 for the torque transmission TT1 and via the interior of the tail rotor shaft support TRSF 1.

The wires 7 for servomotor drive and the wires 8 for servomotor control (see FIG. 11), all of which are routed from the cockpit to send driving current and control signals to the blade pitch angle controller AAC for the above-mentioned tail rotor TR 1', are routed on the exterior of the shaft guard GS3 installed on the aft fuselage and are introduced into the blade pitch angle controller AAC for the tail rotor TR 1'.

Figure 12:
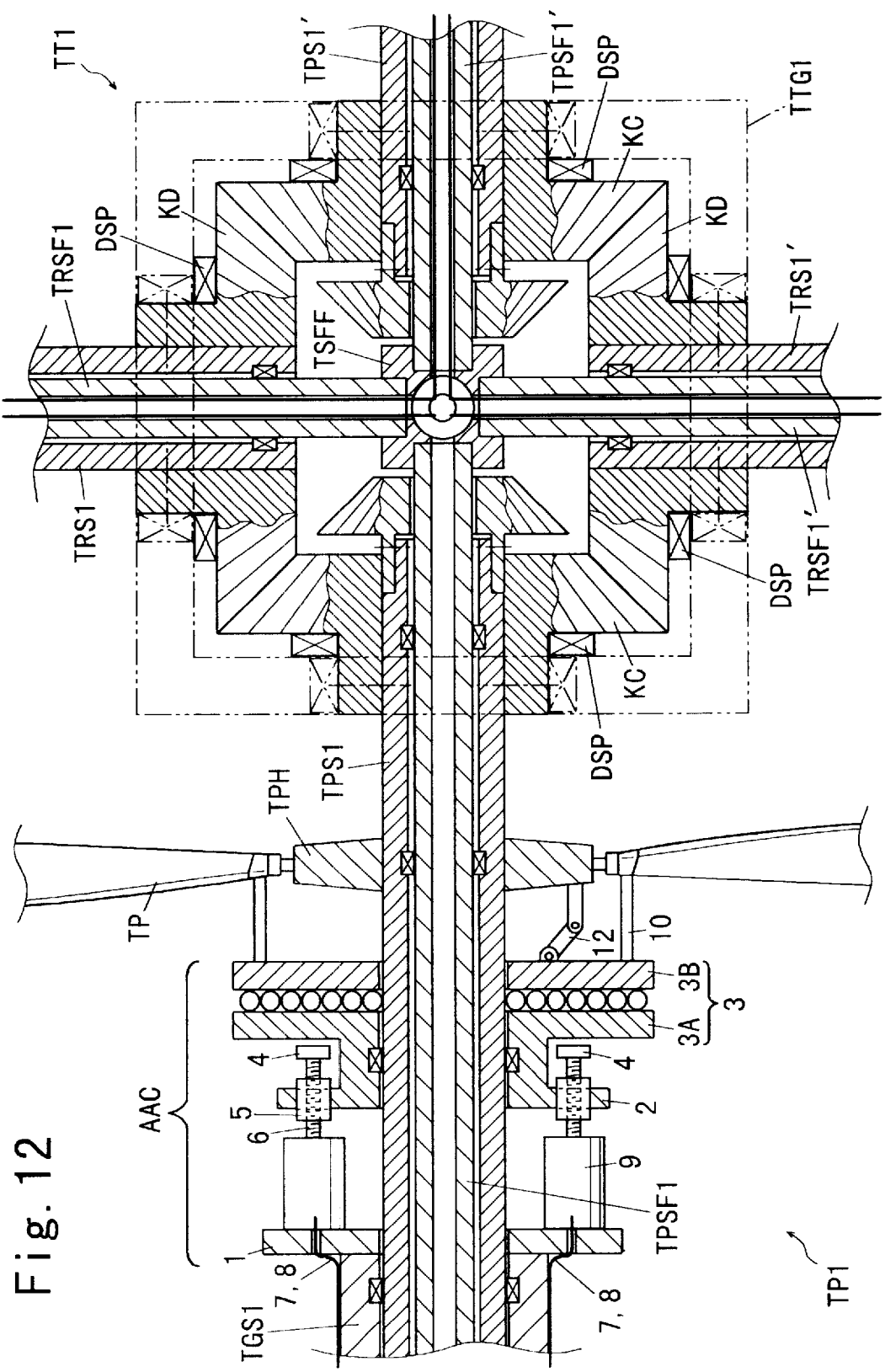
FIG. 12 is a sectional view showing the details of the tail propeller rotor-rotor torque transmission and the TP1 tail propeller both of which are components shown in FIG. 2.
Figure 13:
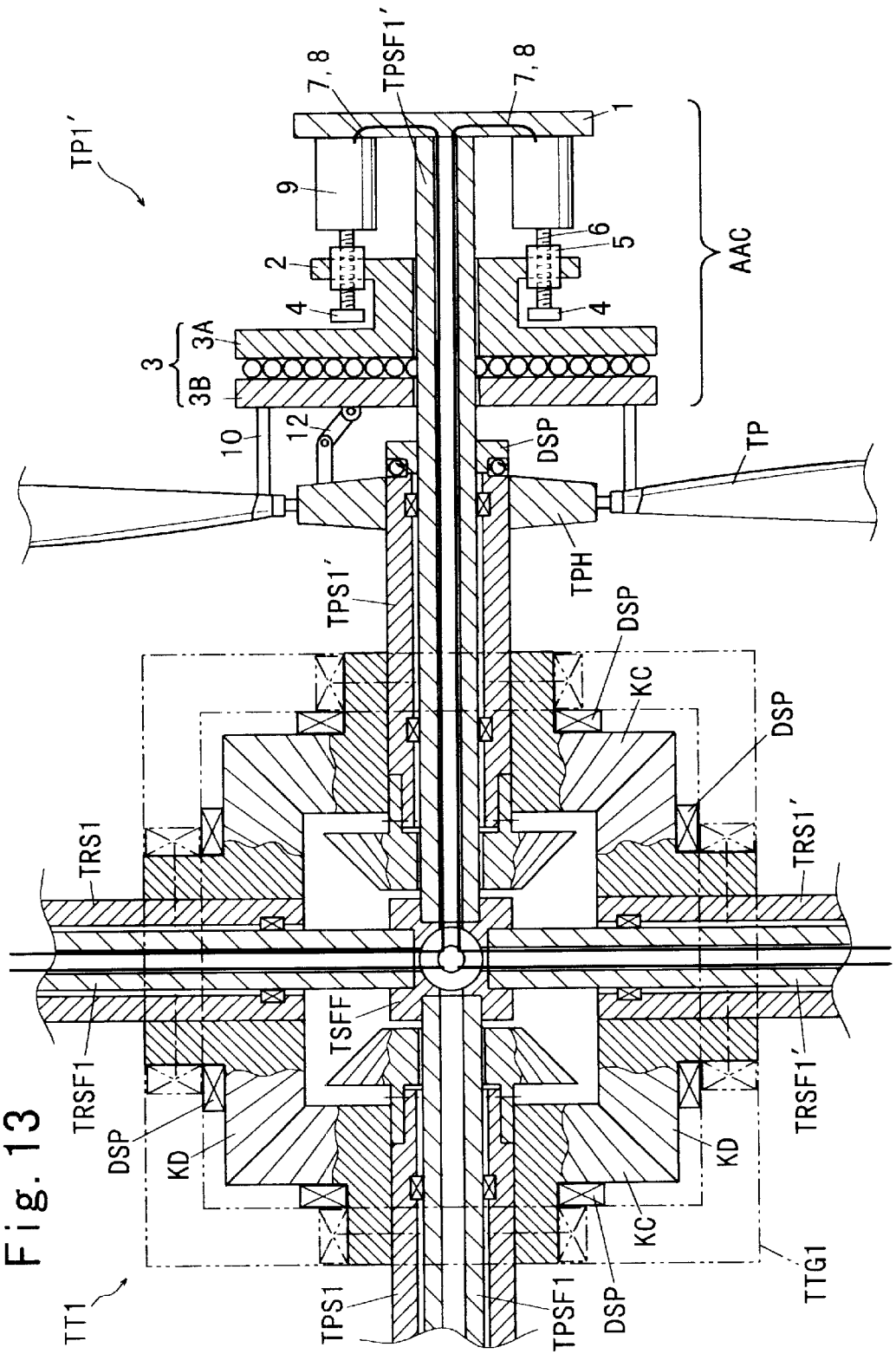
FIG. 13 is a sectional view showing the details of the tail propeller rotor-rotor torque transmission and the TP1' tail propeller, both of which are components shown in FIG. 2.

As shown in FIGS. 12 and 13, the tail propeller TP 1 is installed on the tail propeller shaft TPS 1, and the tail propeller TP 1' is installed at the tip of the tail propeller shaft TPS 1'.

The principle of the above-mentioned pitch angle controller AAC for main propeller blades may be applied to controlling the pitch angles of the tail propellers.

The principle of variable pitch propeller control may also be applied to controlling the pitch angles of the tail propellers.

The wires 7 for servomotor drive and the wires 8 for servomotor control (see FIG. 12), all of which are routed from the cockpit to send driving current and control signals to the blade pitch angle controller AAC for the above-mentioned tail propeller TP 1, are routed in the interior of the shaft guard GS4 and on the exterior of the shaft guard TGS1 installed on the aft fuselage and are introduced into the blade pitch angle controller AAC for the tail propeller TP 1.

The wires 7 for servomotor drive and the wires 8 for servomotor control (see FIG. 13), all of which are routed from the cockpit to send driving current and control signals to the blade pitch angle controller AAC for the above-mentioned tail propeller TP 1', are routed in the interior of the above-mentioned tail rotor shaft support TRSF 1' for the above-mentioned tail rotor shaft TRS1' and are introduced into the blade pitch angle controller AAC for the tail propeller TP 1' via the hollow portion of the tail propeller-rotor shaft support coupler TSFF 1 for the torque transmission TT1 and via the interior of the tail rotor shaft support TRSF 1'.

Figure 14:
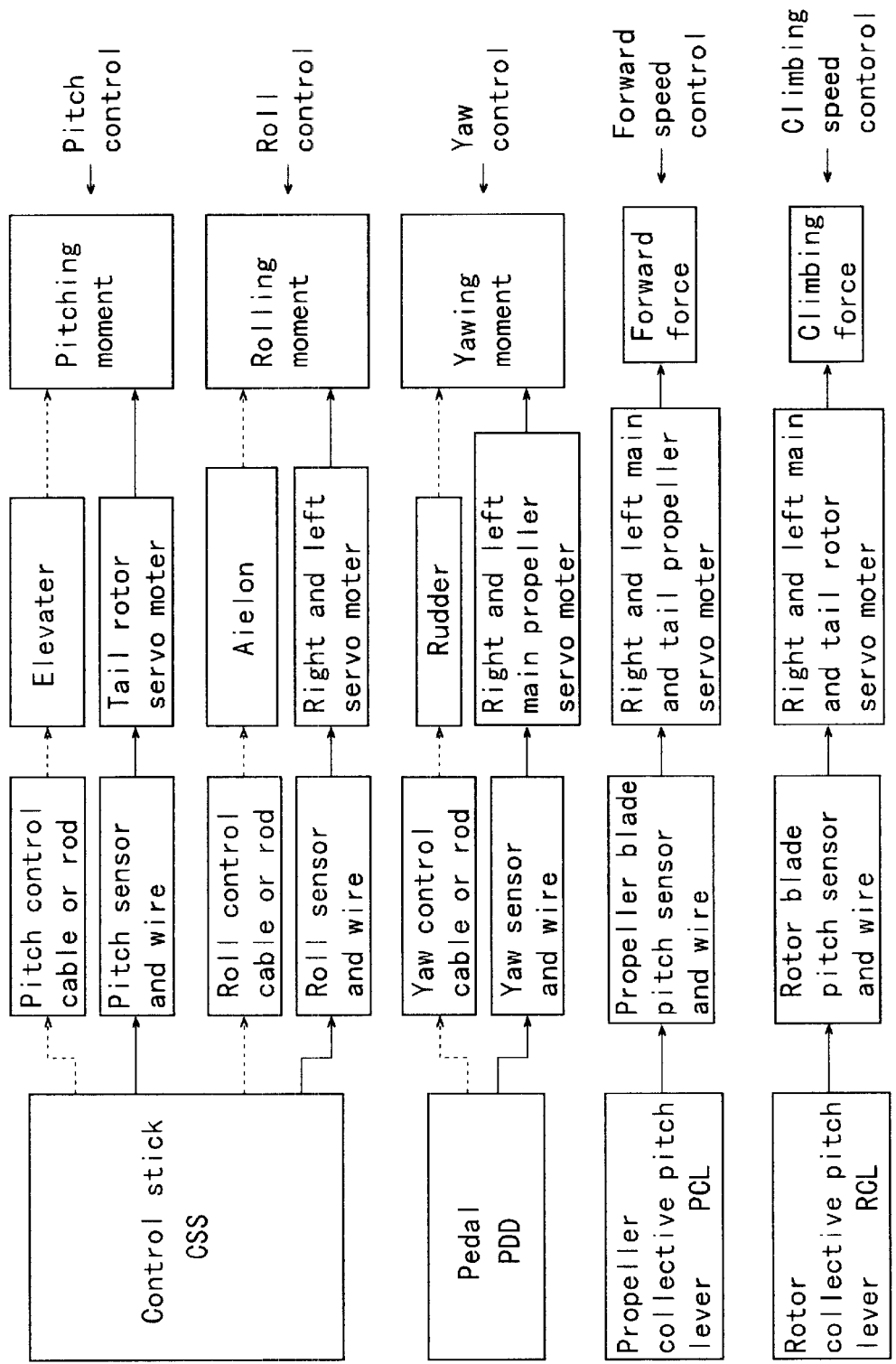
FIG. 14 is a block diagram (1) of the flight control system of an aircraft of the first embodiment.

As shown in the block diagram (1) of the flight control system in FIG. 14, those components of the flight control system which a pilot uses in controlling the aircraft of the first embodiment are the control sick CSS, the pedals PDD, the propeller collective pitch lever PCL, and the rotor collective pitch lever RCL.

(a) Control by Means of Control Stick (Pitch Control and Roll Control)

The lower end of the control stick CSS is linked to the elevators THE and the ailerons MWA by means of cables or connecting rods. The angle of rotation of the control stick CSS is detected by sensors, and resulting displacement signals are outputted via wires into the pitch control servomotors 9 for the right-hand and left-hand main rotor blades MRB and into the pitch control servomotor 9 for the tail rotor blade.

Therefore the flight attitude can be changed if the pilot moves the control stick CSS longitudinally or laterally.

Namely, if the control stick CSS is inclined forward (or aft), then the elevators THE of the horizontal tail wing THW are raised (or lowered), and the lift produced by the tail rotors TR increases (or decreases), thereby causing the aircraft to nose down (or up).

If the control stick CSS is inclined leftward (or rightward), then:
  the left-hand (or right-hand) aileron MWA of the main wing MW is raised;
  the right-hand (or left-hand) aileron MWA of the main wing MW is lowered;
  the lift produced by the left-hand (or right-hand) main rotor MR is decreased (or increased); and
  the lift produced by the right-hand (or left-hand) main rotor MR is increased (or decreased);
thereby causing the aircraft ACT to incline leftward (or rightward).

(b) Control by Means of Pedals (Yaw Control)

The pedals PDD and the vertical tail rudder TVR are linked together by means of cables or connecting rods. If force is applied to either the right-hand pedal or the left-hand pedal, the vertical tail rudder TVR rotates accordingly.

The displacement of pedals PDD is detected by a sensor, and resulting displacement signals are outputted via wires into the pitch control servomotors 9 for the right-hand and left-hand main propellers MP, thereby causing the above-mentioned servomotors to function as directional control systems.

Namely, if the right-hand (or left-hand) pedal is pushed, then:
  the vertical tail rudder TVR is deflected toward the right (or left) of the flight direction;
  the thrust produced by the left-hand (or right-hand) main propeller MP is increased (or decreased); and
  the thrust produced by the right-hand (or left-hand) main propeller MP is decreased (or increased);
thereby causing the aircraft AC to yaw rightward (or leftward) about the center of gravity thereof.

(c) Control by Means of Propeller Collective Pitch Lever (Forward Speed Control)

If the angle of inclination of the propeller collective pitch lever PCL is changed, then the angle of inclination is detected by a sensor, and resulting displacement signals are outputted via wires into the pitch control servomotors for the right-hand and left-hand main propellers MP and into pitch control servomotors for the tail propeller TP. Since the above-mentioned servomotors function as propeller collective pitch controllers PC, the aircraft forward speed can be controlled by changing the collective pitch of the main propellers MP and the tail propellers TP.

Namely, if the angle of inclination of the above-mentioned propeller collective pitch lever is increased (or decreased), then the collective pitch of the right-hand main propeller MP 1 and the collective pitch of the left-hand main propeller MP 2 are increased (or decreased) by the same amount as each other, and the collective pitch of the tail propellers TP is increased (or decreased), thereby causing the forward speed to increase (or decrease).

If the propeller collective pitch lever PCL is twisted, then the resulting twist angle is detected by a sensor, and resulting displacement signals are outputted via wires into the engine fuel control valve. Since the above-mentioned fuel control valve functions as an engine power controller RDSC, the engine power changes.

(d) Control by Means of Rotor Collective Pitch Lever (Climbing Speed Control)

If the angle of inclination of the rotor propeller collective pitch lever RCL is changed, then the angle of inclination is detected by a sensor, and resulting displacement signals are outputted via wires into the pitch control servomotors (or including step motors) for the right-hand and left-hand main rotor blades and into the pitch control servomotor (or including a step motor) for the tail rotor blades. Since the above-mentioned servomotors (or including step motors) function as rotor collective pitch controllers RCC, the collective pitch of the main rotors MR and the collective pitch of the tail rotors TR undergo a change, thereby controlling the climbing speed of the aircraft.

Aircraft forward speed can be controlled by changing the collective pitch of the main propellers MP and of the tail propellers TP.

Namely, if the angle of inclination of the above-mentioned rotor collective pitch lever is increased (or decreased), then the collective pitch of the right-hand main rotor MR 1 and the collective pitch of the left-hand main rotor MR 2 are increased (or decreased) by the same amount as each other, and the collective pitch of the tail rotors TR is increased (or decreased), thereby causing the climbing speed to increase (or decrease).

If the rotor collective pitch lever RCL is twisted, then the resulting twist angle is detected by a sensor, and resulting displacement signals are outputted via wires into the engine fuel control valve. Since the above-mentioned fuel control valve functions as an engine power controller RDSC, the engine power changes.

In the first embodiment of the present invention, either the tail propellers TP or the tail rotors TR may be omitted.

Figure 15:
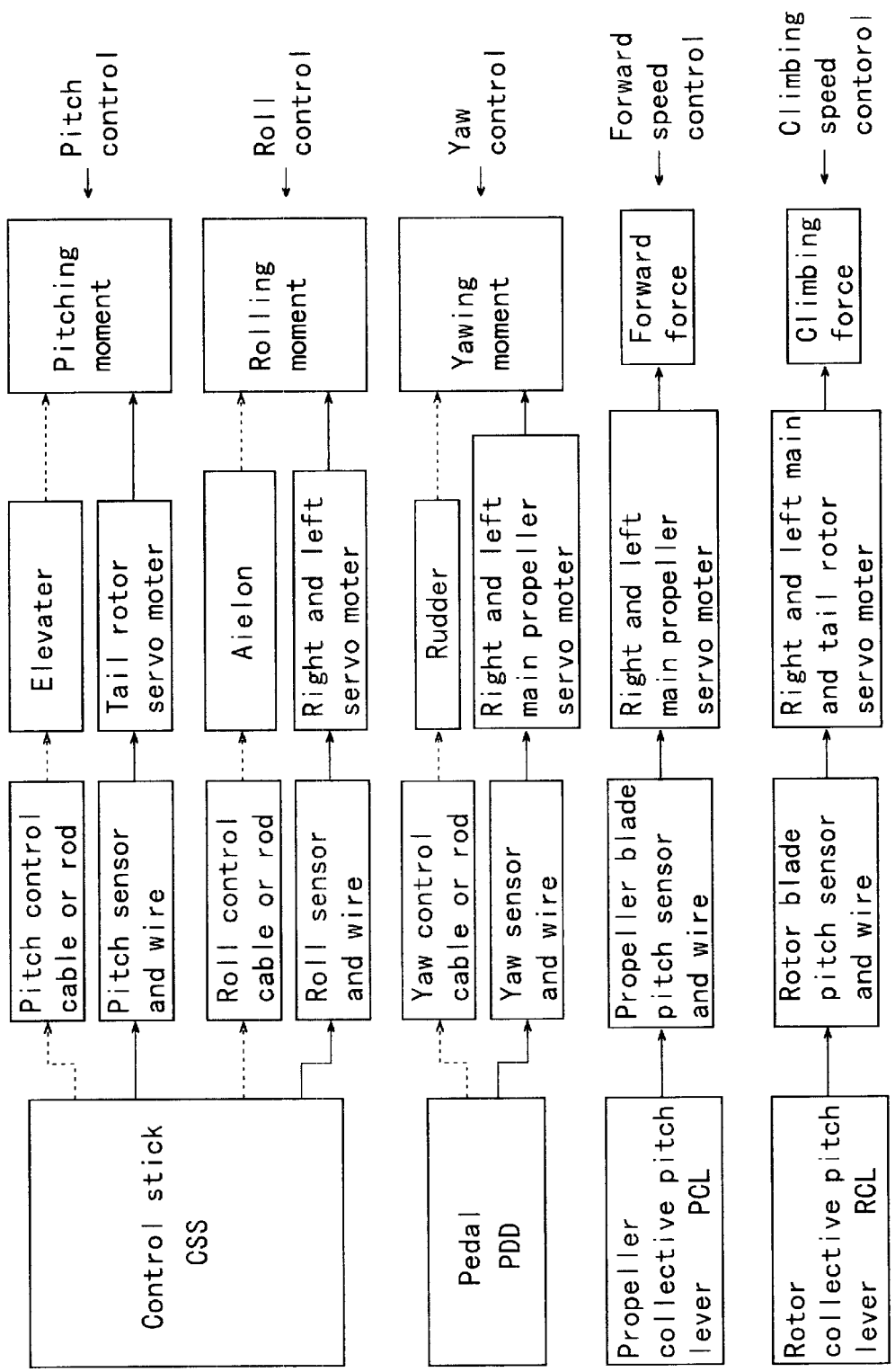
FIG. 15 is a block diagram (2) of the flight control system of an aircraft of the first embodiment.

In the case of the first embodiment wherein the tail propellers TP are omitted, those components of the flight control system which a pilot uses in controlling the aircraft are, as shown in the block diagram (2) of the flight control system in FIG. 15, the control sick CSS, the pedals PDD, the propeller collective pitch lever PCL, and the rotor collective pitch lever RCL. However, since no tail propeller TP is present, forward speed control by means of the propeller collective pitch lever PLC is carried out by controlling the main propellers MP. The control of the other items is carried out in the same way as in the case of FIG. 14.

In the first embodiment of the present invention, all of the tail propellers TP and the tail rotors TR may be omitted.

Figure 16:
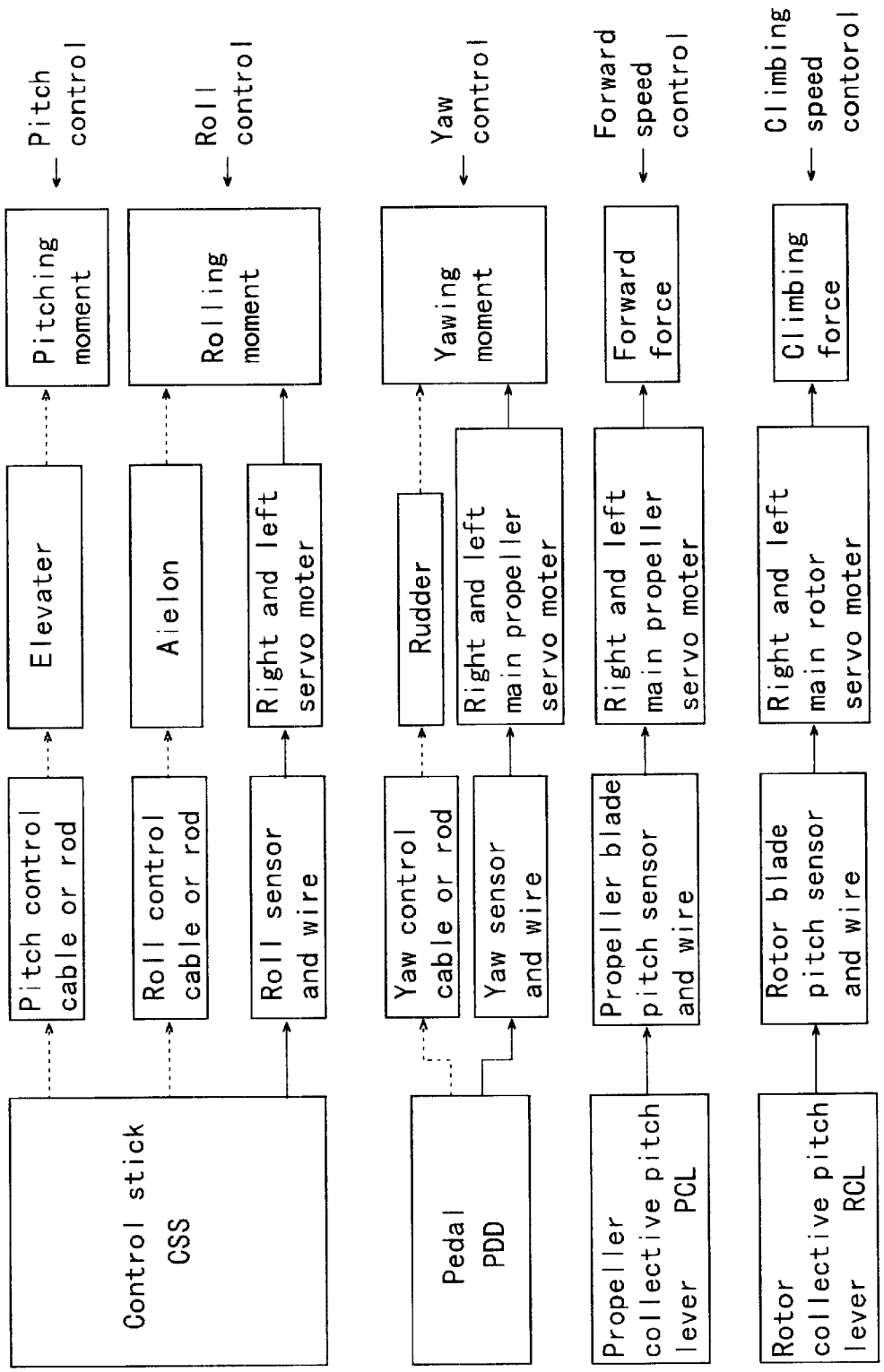
FIG. 16 is a block diagram (3) of the flight control system of an aircraft of the first embodiment.

In the case of the first embodiment wherein all of the tail propellers TP and the tail rotors TR are omitted, those components of the flight control system which a pilot uses in controlling the aircraft are, as shown in the block diagram (3) of the flight control system in FIG. 16, the control sick CSS, the pedals PDD, the propeller collective pitch lever PCL, and the rotor collective pitch lever RCL.

However, since neither tail propellers TP nor tail rotors TR are present:

aircraft pitch control by means of the control stick CSS is carried out by controlling the elevators;

forward speed control by means of the propeller collective pitch lever PCL is carried out by controlling the main propellers MP; and climbing speed control by means of the rotor collective pitch lever RCL is carried out by controlling the main rotors MR.

The control of the other items is carried out in the same way as in the case of FIG. 14.

If the pitch control capability in the helicopter mode is reduced by omitting the tail rotors TR, then the aircraft may be used as an STOL airplane.

Functioning of the First Embodiment (1) The rotation of each of the above-mentioned main propeller blades is synchronized with the rotation of an adjacent main rotor blade. Therefore collision between propeller blades and rotor blades can be prevented although the plane of rotation of each of the above-mentioned propellers intermesh with the plane of rotation of an adjacent rotor, each of the above-mentioned propellers.

(2) The direction of rotation of the forward right-hand main propeller and the direction of rotation of the aft right-hand main propeller are reverse to the direction of rotation of the forward left-hand main propeller and the direction of rotation of the aft left -hand main propeller, respectively, the direction of rotation of the right-hand main rotor is reverse to the direction of rotation of the left-hand main rotor, and the direction of rotation of the forward tail propeller is reverse to the direction of rotation of the aft tail propeller.

Therefore the effect of the torque produced by the rotation of the forward right-hand and aft right-hand main propellers can be canceled out by the effect of the torque produced by the rotation of the forward left-hand and aft left-hand main propellers, the effect of the torque produced by the rotation of the right-hand main rotor can be canceled out by the effect of the torque produced by the rotation of the left-hand main rotor, and the effect of the torque produced by the rotation of the forward tail propeller can be canceled out by the effect of the torque produced by the rotation of the aft tail propeller.

(3) In the case of an aircraft comprising the above-mentioned construction, the flight direction of the aircraft ACT can be controlled by means of a directional (yaw) control system DCS serving to independently control two main propeller pitch controllers one of which is located on the right-hand side of the aircraft ACT and the rest of which is located on the left-hand side of the aircraft ACT.

Namely, the directional (yaw) control of the aircraft ACT can be carried out such that the pitch angle of one propeller (MP 1 or MP 2) on one of the above-mentioned main propeller-rotor torque transmissions (MT 1 or MT 2), one of which is provided on the right-hand side of the above-mentioned aircraft ACT, and the rest of which is provided on the left-hand side of the above-mentioned aircraft ACT, is set at a higher value than the pitch angle of the other propeller (MP 2 or MP 1) on the other main propeller-rotor torque transmissions (MT 2 or MT 1), thereby producing a yawing moment acting on the aircraft ACT.

This yaw control can be carried out in a flight mode wherein the aircraft has no forward speed (in the helicopter mode).

(a) Functioning in the Helicopter Mode

By increasing (decreasing) the angle of inclination of the rotor collective pitch lever RCL, the lifts produced by the right-hand and left-hand main rotors increase (decrease) simultaneously, thereby causing the aircraft ACT to vertically climb (descend).

If the control stick CSS is inclined forward (aft), then the angle of inclination is detected by a sensor, and resulting displacement signals are outputted via wires into the pitch control servomotors for the tail rotor blades, thereby increasing (decreasing) the thrusts of the tail rotors TR, and thus causing the aircraft ACT to nose down (up).

If the control stick CSS is inclined leftward (rightward), then the angle of inclination is detected by a sensor, and resulting displacement signals are outputted via wires into the pitch control servomotors for the right-hand and left-hand main rotor blades MRB, thereby decreasing the thrust of the left-hand main rotor and, increasing the thrust of the right-hand main rotor, and thus causing the aircraft ACT to roll leftward (rightward). If the right-hand (left-hand) pedal is pushed, then the pedal deflection is detected by a sensor, and resulting displacement signals are outputted via wires into the pitch control servomotors for the right-hand and left-hand main rotor blades MRB, thereby increasing (decreasing) the thrust produced by the left-hand (right-hand) main propeller and increasing (decreasing) the thrust produced by the right-hand (left-hand) main propeller, and thus causing the aircraft to yaw rightward (leftward) about the center of gravity thereof.

It is also possible for the aircraft ACT to fly by autorotation.

(b) Functioning in the Fixed Wing Mode

By increasing (or decreasing) the angle of inclination of the propeller collective pitch lever PCL, the pitch angle of the right-hand main propeller blades MPB and the pitch angle of the left-hand main propeller blade MPB can be increased (or decreased) by the same amount as each other, thereby causing the forward speed of the aircraft ACT to increase (or decrease).

If the control stick CSS is inclined forward (or aft), then the horizontal tail elevators THE are raised (or lowered), thereby causing the aircraft ACT to nose down (or up).

If the control stick CSS is inclined leftward (or rightward), then the left-hand (or right-hand) aileron MWA is raised and the right-hand (or left-hand) aileron MWA is lowered, thereby causing the aircraft ACT to roll leftward (or rightward).

If the right-hand (or left-hand) pedal is pushed, then rudder is deflected rightward (or leftward), thereby causing the aircraft ACT to yaw rightward (or leftward) about the center of gravity thereof.

(c) Functioning in the Compound Mode

The functioning in the compound mode is a combination of the above-mentioned functioning in the helicopter mode and the above-mentioned functioning in the fixed wing mode.

Second Embodiment

Figure 17:
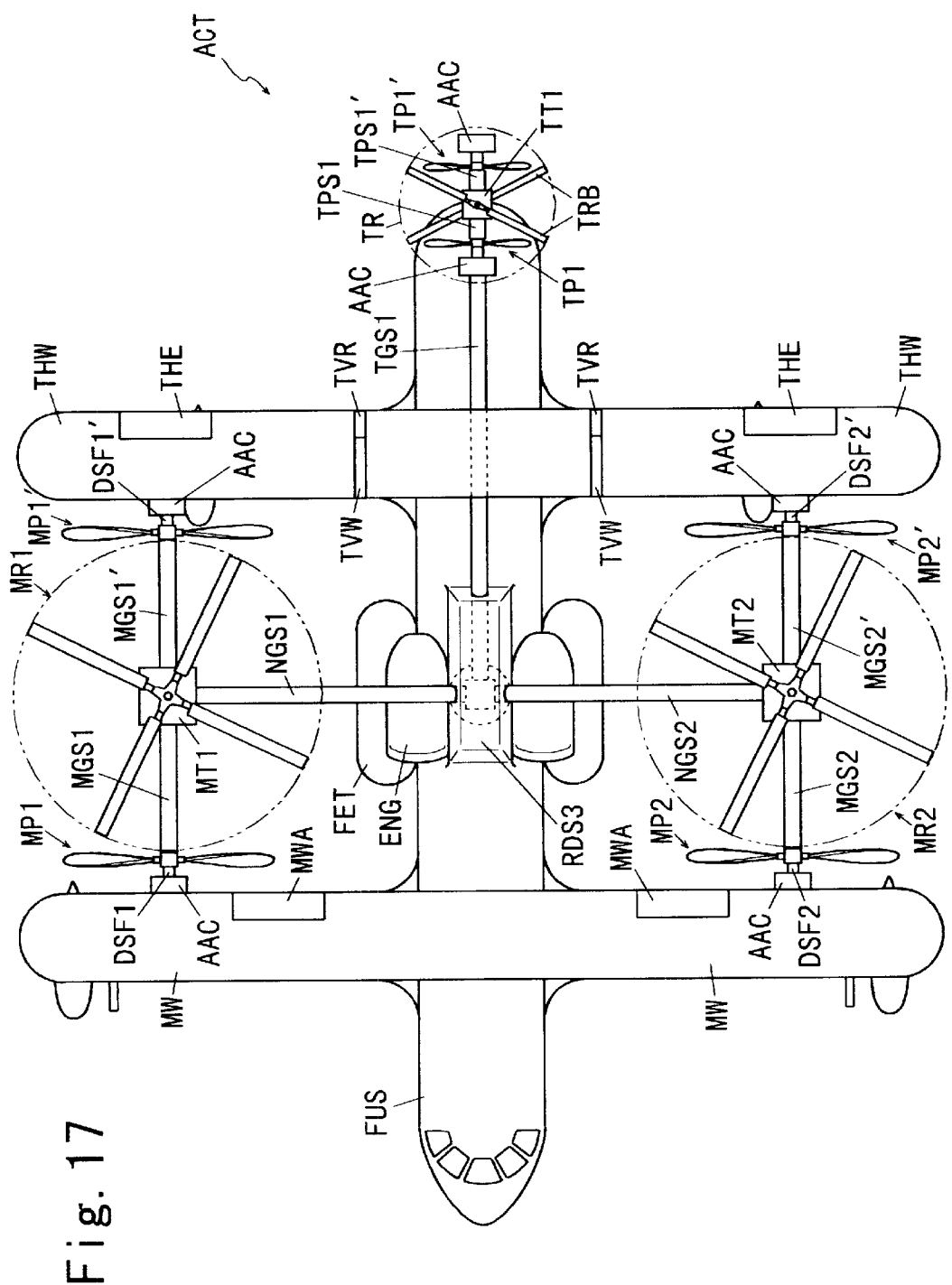
FIG. 17 is a plan view of an aircraft of the second embodiment.

Reference being had to FIG. 17, the aircraft of the second embodiment of the present invention is explained. FIG. 17 is a drawing corresponding to FIG. 1 of the above-mentioned first embodiment.

In the explanation of the second embodiment, such a component of the second embodiment which corresponds to one of the components of the first embodiment is denoted by the same symbol as that of the corresponding component of the first embodiment, and detailed explanation of any such component of the second embodiment is omitted.

The second embodiment differs from the first embodiment in the following respects, but is constructed similarly to the first embodiment in all the other respects.

The aircraft of the second embodiment differs from the aircraft of the first embodiment in the following respects.

(1) The main propellers MP 1 and MP 2 are located at a longitudinal position aft of the main wing MW and forward of the planes of rotation of the main rotors MR 1 and MR 2 for the purpose of preventing the planes of rotation of the main propellers from intermeshing with the planes of rotation of the main rotors.

(2) The main propellers MP 1' and MP 2' are located at a longitudinal position forward of the horizontal tail wing THW and aft of the planes rotation of the main rotors MR 1 and MR 2 for the same purpose that is stated in item (1) above.

Functioning of the Second Embodiment

Since the planes of rotation of the main propellers MP 1, MP 1', MP 2 and MP 2' do not intermesh with the planes of rotation of the main rotors MR 1 and MR 2, it is not necessary to synchronize the rotation of the main propellers with the rotation of the main rotors.

Therefore the rotational speed of the main propellers can be made different from the rotational speed of the main rotors.

Since the planes of rotation of the main propellers do not intermesh with the planes of rotation of the main rotors, the number of blades of the propellers and the number of blades of the rotors can be chosen freely.

All the other aspects of the functioning of the second embodiment are the same as the corresponding aspects of the functioning of the first embodiment.

Third Embodiment

Figure 18:
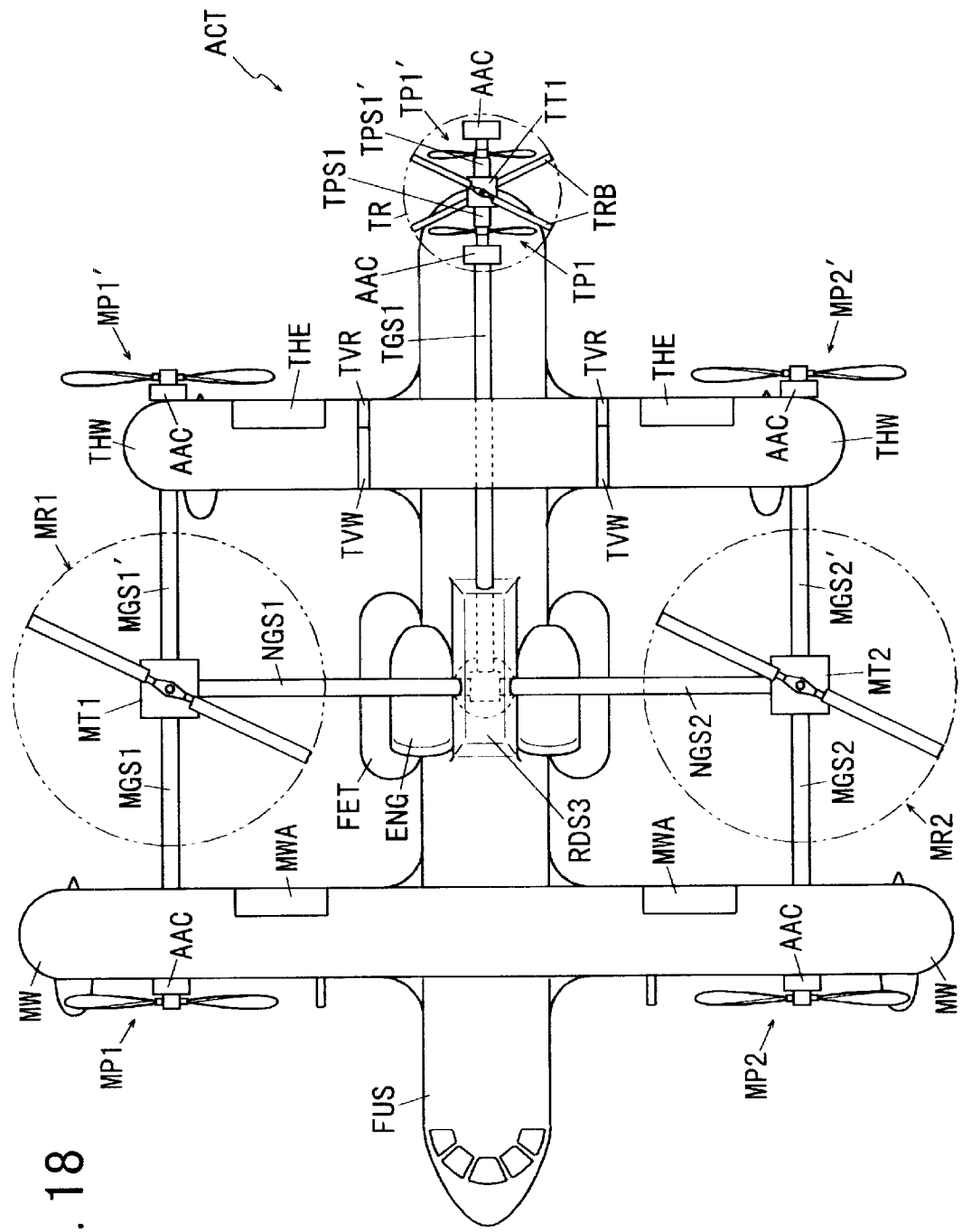
FIG. 18 is a plan view of an aircraft of the third embodiment.
Figure 19:
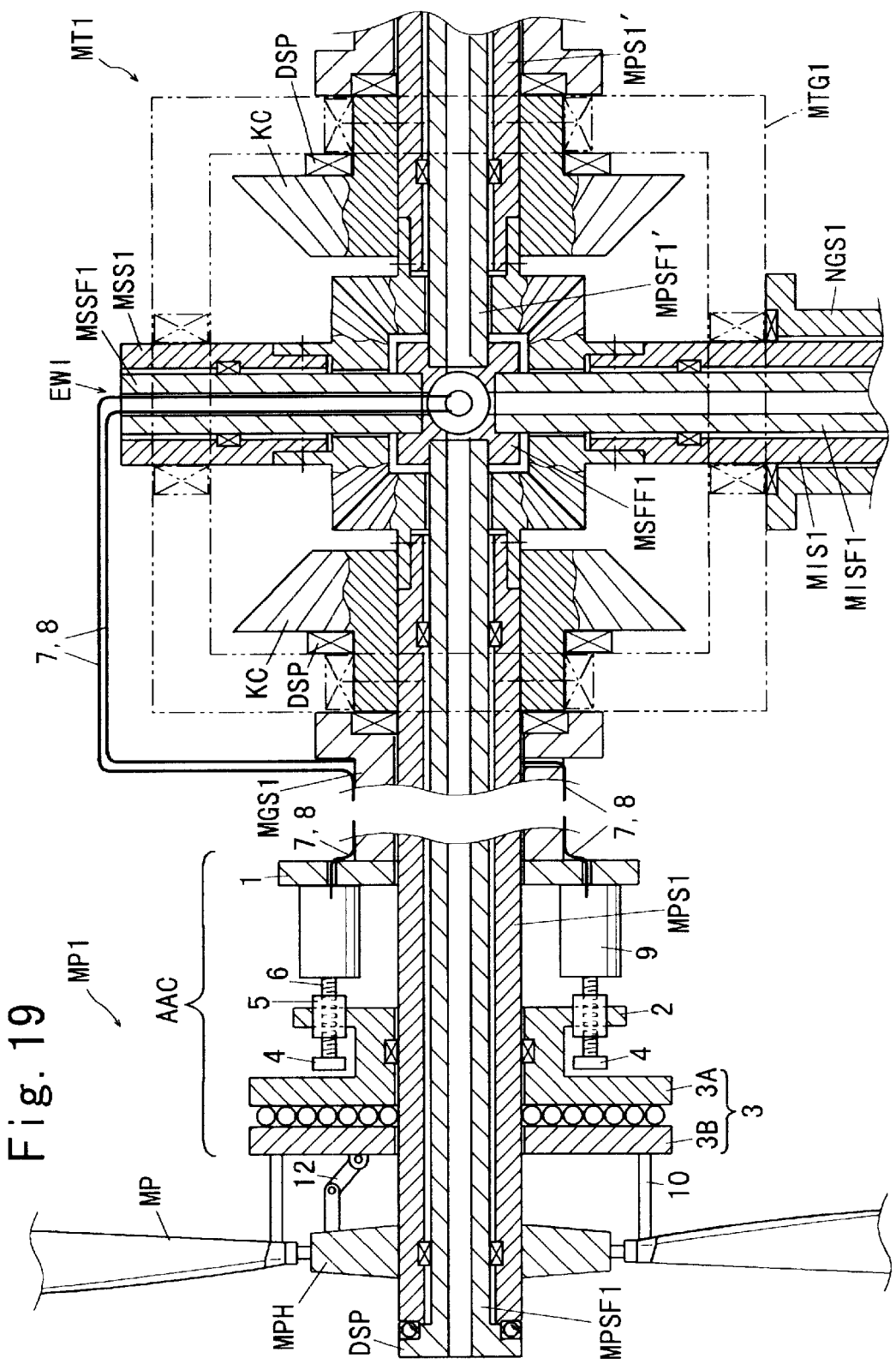
FIG. 19 is a sectional view showing the details of the main propeller-rotor torque transmission and the MP1 main propeller, both of which are components shown in FIG. 18.
Figure 20:
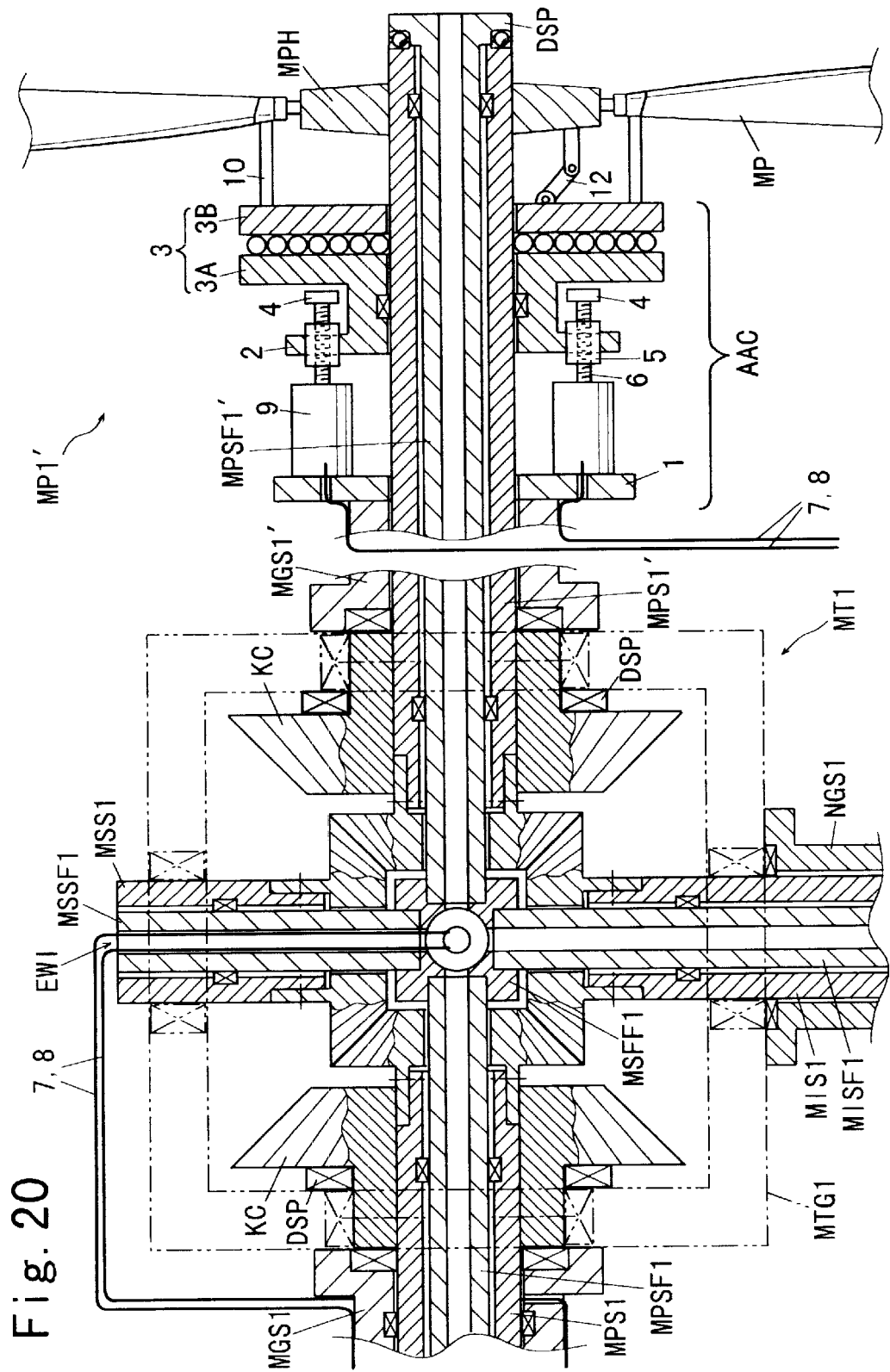
FIG. 20 is a sectional view showing the details of the main propeller-rotor torque transmission and the MP1' main propeller, both of which are components shown in FIG. 18.

Reference being had to FIGS. 18 through 20, the aircraft of the third embodiment of the present invention is explained. FIG. 18 is a drawing corresponding to FIG. 17 of the above-mentioned second embodiment.

In the explanation of the third embodiment, such a component of this embodiment as corresponds to one of the components of either of the above-mentioned first and second embodiments is denoted by the same symbol as that of the corresponding component of the pertinent embodiment, and detailed explanation of any such component of the third embodiment is omitted.

The third embodiment differs from the above-mentioned second embodiment in the following respects, but is constructed similarly to the second embodiment in all the other respects.

The aircraft of the third embodiment differs from the aircraft of the second embodiment in the following respects.

(1) The main propellers MP 1 and MP 2 are located at a longitudinal position forward of the main wing MW, and the main propellers MP 1' and MP 2' are located at a longitudinal position aft of the horizontal tail wing THIW for the purpose of preventing the planes of rotation of the main propellers MP 1, MP 1', MP 2, and MP 2' from intermeshing with the planes of rotation of the main rotors MR 1 and MR 2.

(2) Wires 7 for servomotor drive and wires 8 for servomotor control (see FIG. 19), all of which are routed from the cockpit to send driving current and control signals to the blade pitch angle controllers AAC for the main propellers MP 1 and MP 2, are introduced into the above-mentioned blade pitch angle controllers AAC via the exterior of the shaft guards MSG 1 and MS G 2 both of which are installed on the main wing MW.

(3) Wires 7 for servomotor drive and wires 8 for servomotor control (see FIG. 20), all of x.

(4) Wires 7 for servomotor drive and wires 8 for servomotor control (see FIGS. 19 and 20), all of which are routed from the cockpit to send driving current and control signals to the blade pitch angle controller AAC for the main rotor MR 1, are:

routed on the exterior of the of a shaft guard MSG 1 installed on the main horizontal wing MW;

introduced into the hollow section of a shaft support coupler MSFF 1 through a wire intake EW1 in the torque transmission MT 1;

routed through the interior of a main rotor shaft guard MRSF 1; and introduced into the blade pitch angle controller AAC for the main rotor MR 1.

Wires 7 for servomotor drive and wires 8 for servomotor control, all of which are routed from the cockpit to send driving current and control signals to the blade pitch angle controller AAC for the main rotor MR 2, are introduced into this blade pitch angle controller in a manner similar to the case of the wires 7 and 8 introduced into the blade pitch angle controller AAC for the main rotor MR 1.

Functioning of the Third Embodiment

In the third embodiment, the distances from the blade tip of the main rotor MR 1 to the planes of rotation of the main propellers MP 1 and MP 1', as well as the distances from the blade tip of the main rotor MR 2 to the planes of rotation of the main propellers MP 2 and MP 2', are greater in the third embodiment than in the case of the second embodiment. Therefore it is possible, in this embodiment, to reduce the interference loss of the main propellers MP and the main rotors MR to a level lower than is the case with the second embodiment.

All the other aspects of the functioning of the third embodiment are the same as the corresponding aspects of the embodiment of the second embodiment.

Fourth Embodiment

Figure 21:
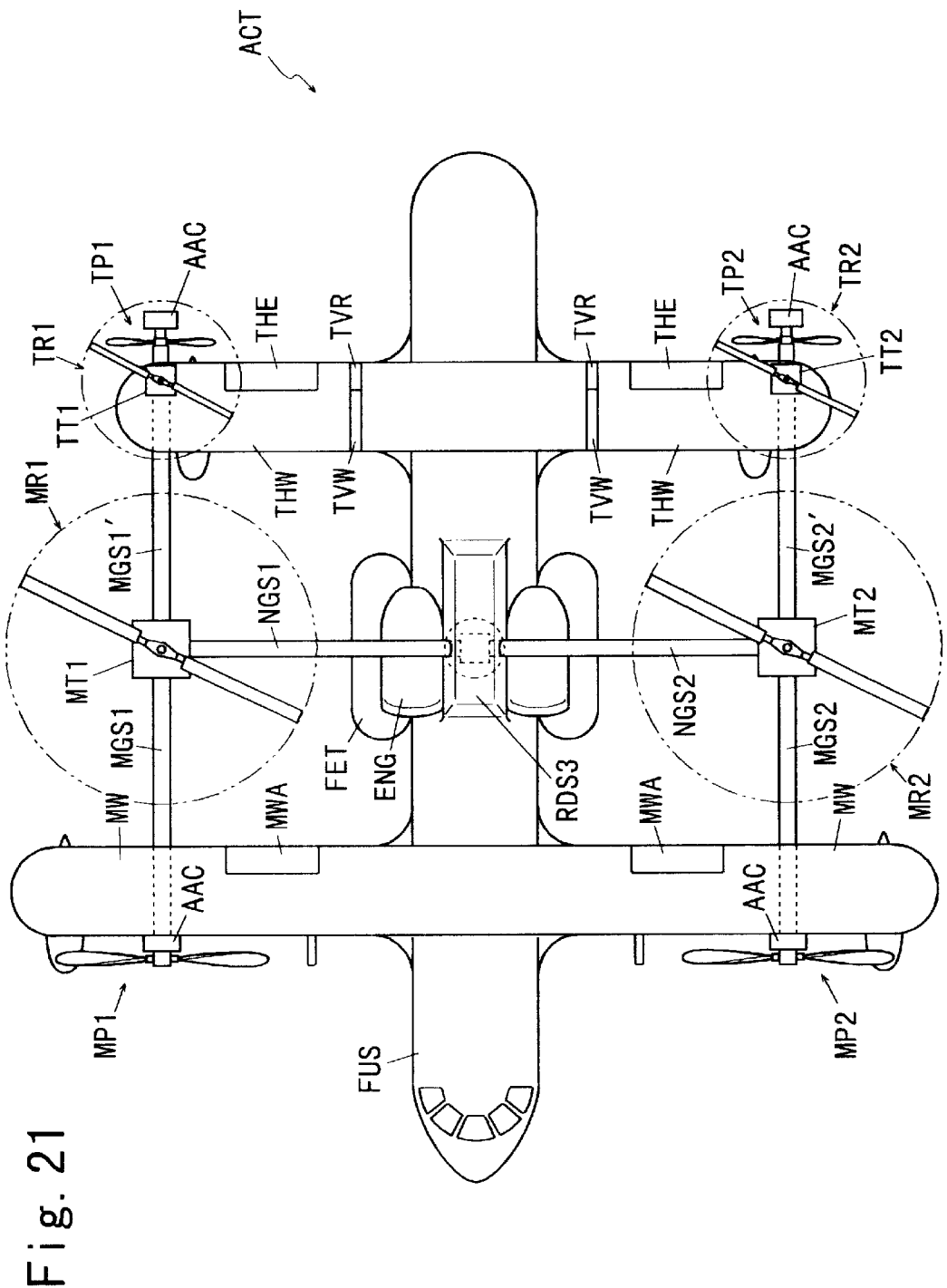
FIG. 21 is a plan view of an aircraft of the fourth embodiment.
Figure 22:
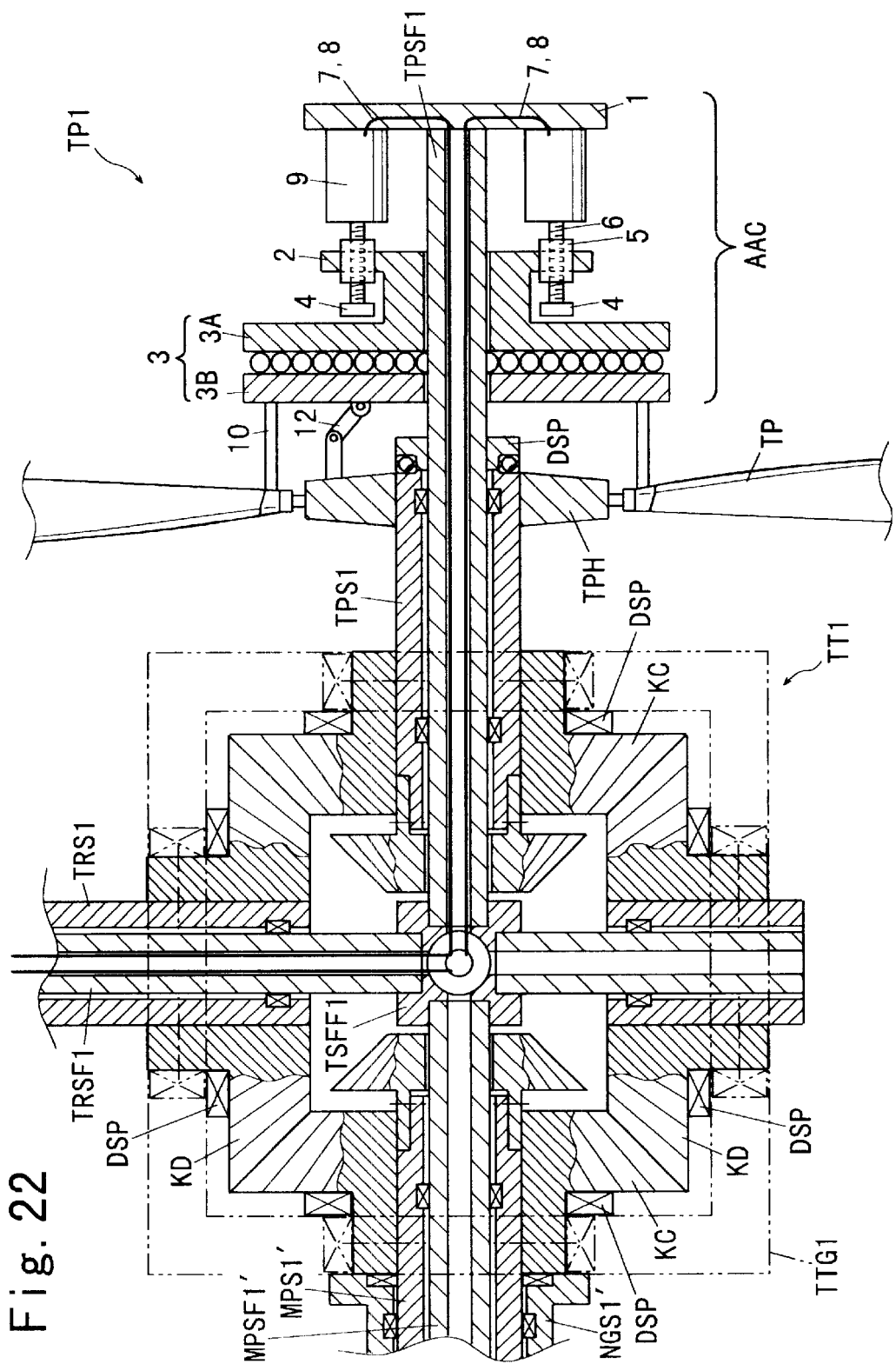
FIG. 22 is a sectional view showing the details of the tail propeller-rotor torque transmission and the TP1 tail propeller, both of which are components shown in FIG. 21.

Reference being had to FIGS. 21 through 22, the aircraft of the fourth embodiment of the present invention is explained. FIG. 21 is a drawing corresponding to FIG. 18 of the above-mentioned third embodiment.

In the explanation of the fourth embodiment, such a component of this embodiment as corresponds to one of the components of any of the first through third embodiments is denoted by the same symbol as that of the corresponding component of the pertinent embodiment, and detailed explanation of any such component of the third embodiment is omitted.

The aircraft of the fourth embodiment differs from the aircraft of the third embodiment in the following respects.

(1) The tail propeller-rotor torque transmissions TT 1 and TT 2 are installed in the rear right-hand part and in the rear left-hand part, respectively, of the horizontal tail wing THW.

(2) The above-mentioned tail propeller-rotor torque transmission TT 1 comprises the tail rotor shaft TRS 1 and the tail propeller shaft TPS 1.

The tail rotor shaft TRS 1 is supported by the tail rotor shaft support TRSF 1, and the tail propeller shaft TPS 1 is supported by the tail propeller shaft support TPSF 1.

The tail rotor shaft support TRSF 1 and the tail propeller shaft support TPSF 1, both of which are hollow, are contained inside the above-mentioned tail rotor shaft TRS 1 and tail propeller shaft TPS 1, respectively, and one end of each of the above-mentioned shaft supports is linked to the tail propeller-rotor shaft support coupler TSFF 1 in such a way as to preclude rotation.

The tail rotor TR 1 is installed at the tip of the tail rotor shaft TRS 1, and the tail propeller TP 1 is installed at the tip of the tail propeller shaft TPS 1.

(3) The power inputted into the above-mentioned torque transmission TT 1 is transmitted from above-mentioned torque transmission MT 1 via a shaft located inside the shaft guard MGS 1'.

(4) Wires 7 for servomotor drive and wires 8 for servomotor control, all of which are routed from the cockpit via the horizontal tail wing THW to send driving current and control signals (transmitted from the flight control system) to the blade pitch angle controller AAC for the tail propeller TP 1, are taken in through a wire intake (which is not shown in FIG. 22) in the tail propeller-rotor torque transmission TT 1, and are introduced into the blade pitch angle controller AAC for the tail propeller TP 1 via the hollow section of a tail propeller-rotor shaft support coupler TSFF 1 and via the hollow section of the a propeller shaft support TPSF 1.

(5) Wires 7 for servomotor drive and wires 8 for servomotor control (see FIG. 22), all of which are routed from the cockpit via the horizontal tail wing THW to send driving current and control signals to the blade pitch angle controller AAC for the tail rotor TR 1, are taken in through a wire intake (which is not shown in FIG. 22) in the tail propeller-rotor torque transmission TT 1, and are introduced into the blade pitch angle controller AAC for the tail propeller TP 1 via the hollow section of a tail propeller-rotor shaft support coupler TSFF 1 and via the hollow section of a tail rotor shaft support TRSF 1.

(6) The tail propeller-rotor torque transmission TT 2 is constructed similarly to the above-mentioned tail propeller-rotor torque transmission TT 1.

Functioning of the Fourth Embodiment

Since the tail propeller TP 1 and the tail rotor TR1 are installed on the right-hand part of the horizontal tail wing THW and the tail propeller TP 2 and the tail rotor TR2 are installed on the left-hand part of the horizontal tail wing THW, the pitch control moment and the yaw control moment, both of which act on the aircraft ACT, can be increased.

All the other aspects of the functioning of the fourth embodiment are the same as the corresponding aspects of the embodiment of the third embodiment.

Fifth Embodiment

Figure 23:
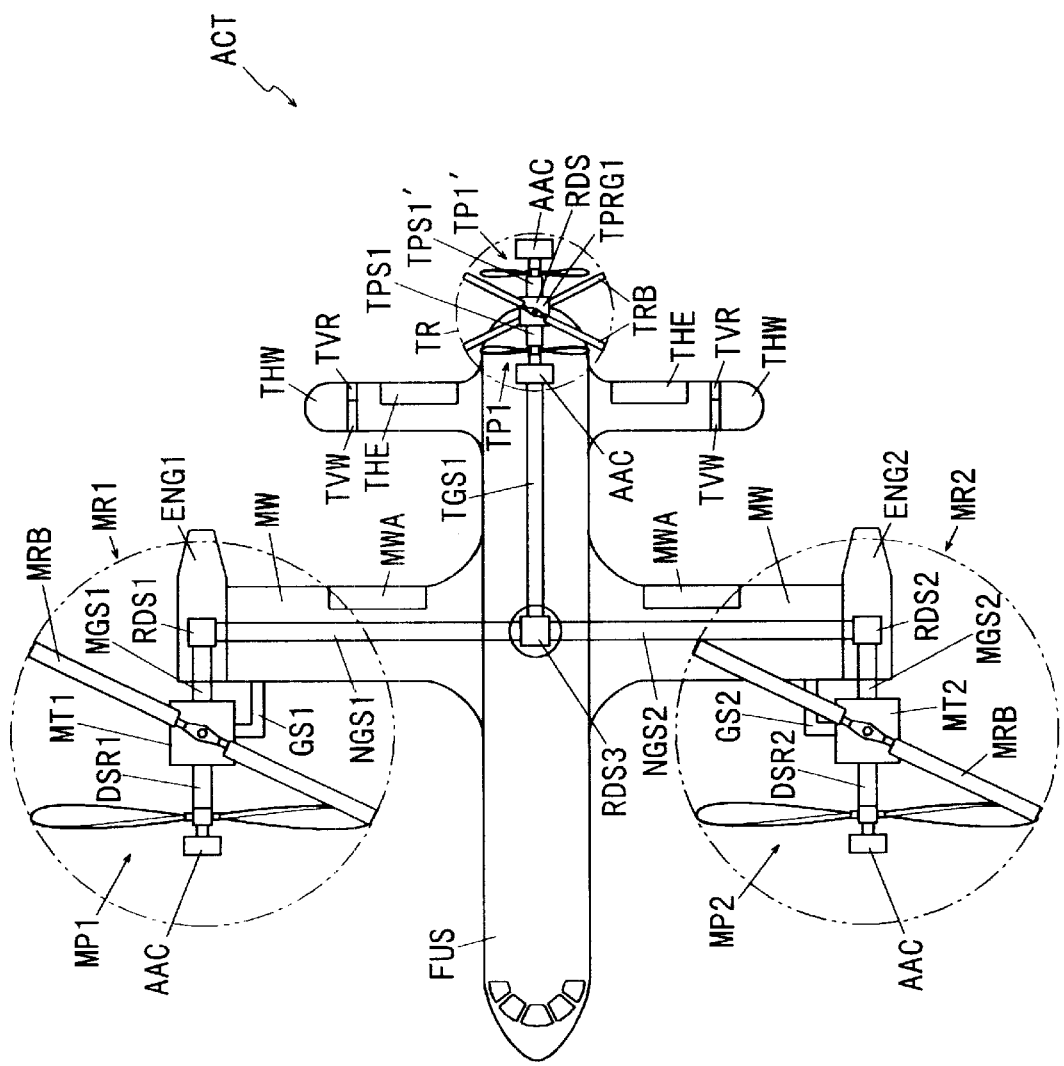
FIG. 23 is a plan view of an aircraft of the fifth embodiment.
Figure 24:
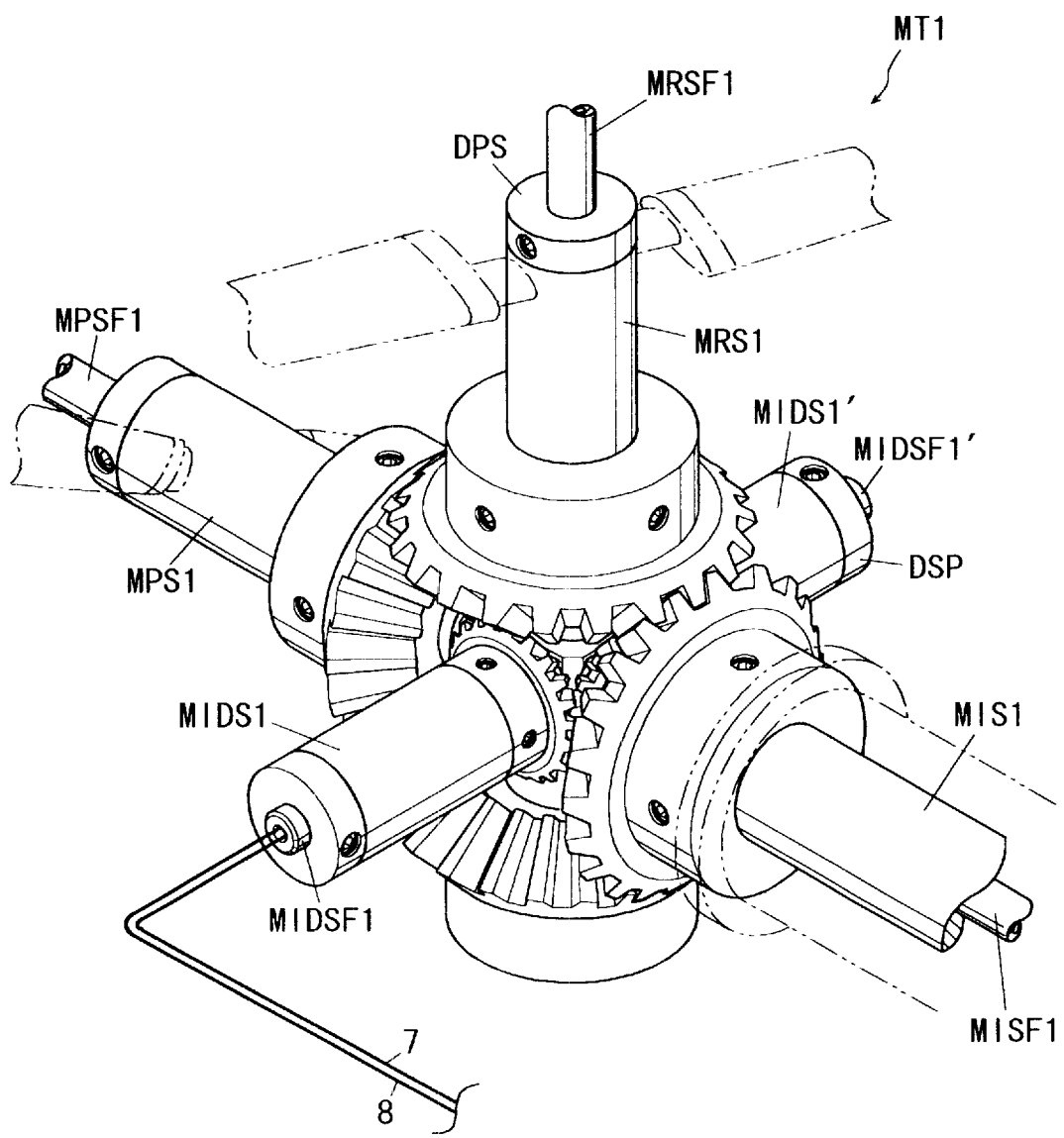
FIG. 24 is an explanatory drawing of the input shaft, the propeller shaft, the rotor shaft, the first and second idling shafts, the input shaft support, the propeller shaft support, the rotor shaft support, and the first and second idling shaft supports, for the main propeller-rotor torque transmission of the fifth embodiment.
Figure 25:
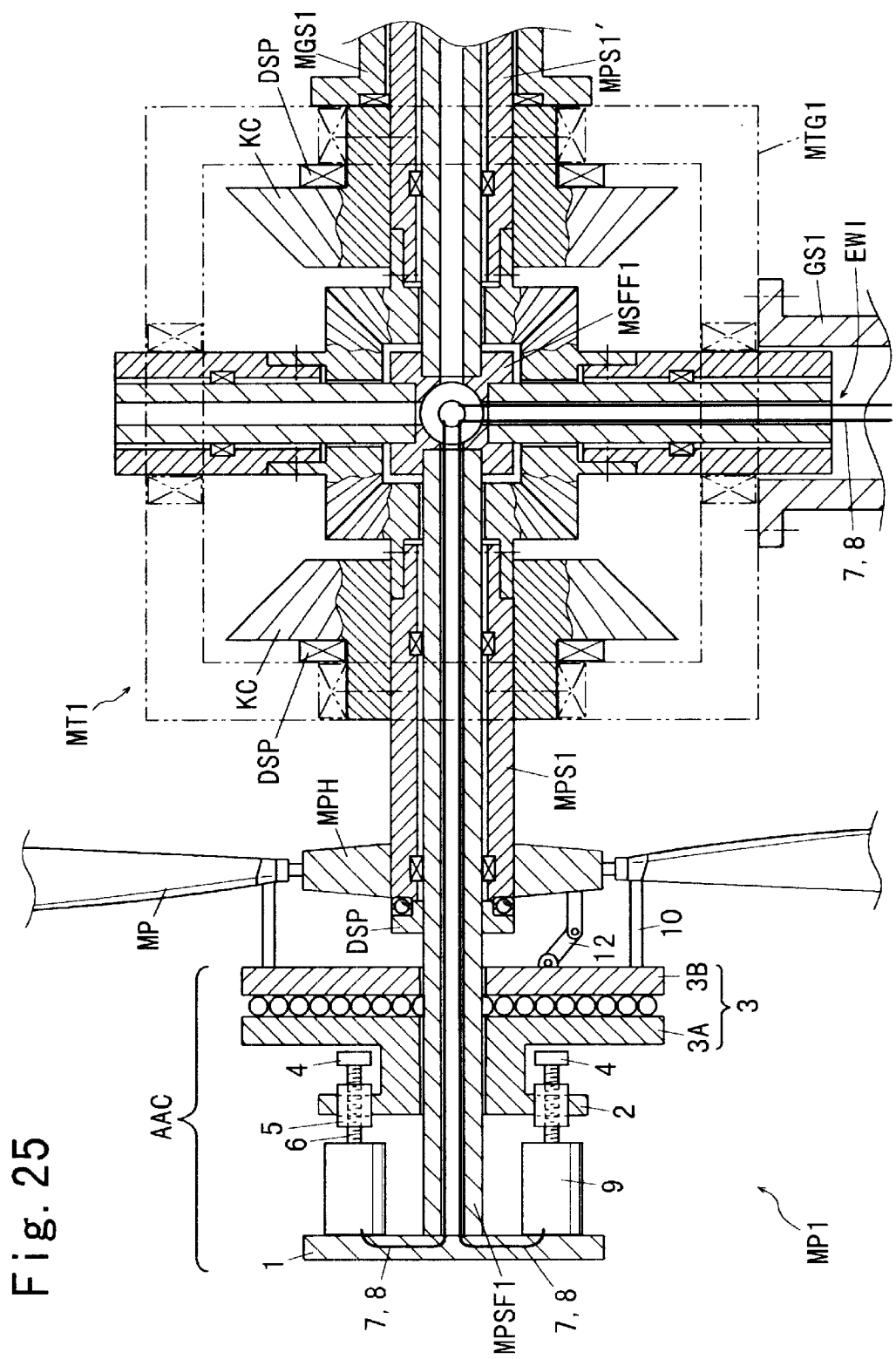
FIG. 25 is a sectional view showing the details of the main propeller-rotor torque transmission and the MP1 main propeller, both of which are components shown in FIG. 23.

Reference being had to FIGS. 23 through 25, the aircraft of the fifth embodiment of the present invention is explained. FIG. 23 is a drawing corresponding to FIG. 1 of the above-mentioned first embodiment.

In the explanation of the fifth embodiment, such a component of this embodiment as corresponds to one of the components of any of the first through fourth embodiments is denoted by the same symbol as that of the corresponding component of the pertinent embodiment, and detailed explanation of any such component of the third embodiment is omitted.

The fifth embodiment differs from the above-mentioned first embodiment in the following respects, but is constructed similarly to the above-mentioned first embodiment in all the other respects.

The aircraft of the fifth embodiment differs from the aircraft of the first embodiment in the following respects.

The tail propeller-rotor torque transmission TT 2 is constructed similarly to the above-mentioned tail propeller-rotor torque transmission TT 1.

(1) The main propeller-rotor torque transmissions MT 1 and MT 2 are installed at a longitudinal position in the right-hand and left-hand parts of the aircraft, respectively, forward of the main wing MW.

(2) The above-mentioned main propeller-rotor torque transmission MT 1 is retained by shaft guards MGS 1 and GS 1, both of which extend forward of the main wing MW, and the above-mentioned main propeller-rotor torque transmission MT 2 is retained by shaft guards MGS 2 and GS 2, both of which extend forward of the main wing MW.

(3) The main propeller-rotor torque transmission MT 1 has:

a main rotor MR 1 which rotates at a position above the main propeller-rotor torque transmission MT 1; and a main propeller MP 1 which rotates at a position forward of the main propeller-rotor torque transmission MT 1.

The main propeller-rotor torque transmission MT 2 has:

a main rotor MR 2 located at a vertical position above the main propeller-rotor torque transmission MT 2; and a main propeller MP 2 located at a longitudinal position forward of the main propeller-rotor torque transmission MT 2.

(4) The tail propeller-rotor torque transmission TT 1 has:

a tail rotor TR 1 located at a vertical position above the tail propeller-rotor torque transmission TT 1;

a tail propeller TP 1 located at a longitudinal position forward of the tail propeller-rotor torque transmission TT 1, and a tail propeller TP 1' located at a longitudinal position aft of the tail propeller-rotor torque transmission TT 1.

(5) Power generated by an engine ENG 1 located in the right-hand part of the main wing MW and power generated by an engine ENG 2 located in the left-hand part of the main wing MW are inputted into engine gearboxes RDS 1 and RDS 2, respectively. Power inputted into the engine gearbox RDS 1 and power inputted into the engine gearbox RDS 2 are:

transmitted to the above-mentioned main propeller-rotor torque transmissions MT 1 and MT 2, respectively, via shafts located inside shaft guards MGS 1 and MGS 2, respectively; and transmitted to an engine gearbox RDS 3 located in the fuselage FUS by means of transmission shafts located inside shaft guards NGS 1 and NGS 2, respectively.

Power inputted into the above-mentioned engine gearbox RDS 3 is transmitted to the above-mentioned tail propeller-rotor torque transmission TT 1 by means of a shaft located inside a shaft guard TGS 1.

(6) Wires 7 for servomotor drive and wires 8 for servomotor control (see FIG. 25), all of which are routed from the cockpit to send driving current and control signals to the blade pitch angle controller AAC for the main propeller MP 1, are:

routed through the interior of a shaft guard GS 1 installed on the above-mentioned main wing MW;

routed through the hollow section of a main propeller-rotor shaft support coupler MSFF 1 through a wire intake (which is not shown in FIG. 23) in the main propeller-rotor torque transmission MT 1;

routed through the interior of a main propeller shaft support MPSF 1; and introduced into the blade pitch angle controller AAC for the main propeller MP 1.

Wires 7 for servomotor drive and wires 8 for servomotor control, all of which are routed from the cockpit to send driving current and control signals to the blade pitch angle controller AAC for the main propeller MP 2, are introduced into the blade pitch angle controller AAC for the main propeller MP 2 in a manner similar to the case of the wires 7 and 8 introduced into the blade pitch angle controller AAC for the main propeller MP 1.

(7) Wires 7 for servomotor drive and wires 8 for servomotor control (see FIG. 25), all of which are routed from the cockpit to send driving current and control signals to the blade pitch angle controllers AAC for the main rotor MR 1, are:

routed through the interior of a shaft guard GS 1 installed on the above-mentioned main wing MW;

routed through the hollow sections of a main propeller-rotor shaft support coupler MSFF 1 through a wire intake (which is not shown in FIG. 25) in the above-mentioned main propeller-rotor torque transmissions MT 1;

routed through the interiors of a main rotor shaft support MRSF 1, respectively; and introduced into the blade pitch angle controllers AAC for the main rotor MR 1.

Wires 7 for servomotor drive and wires 8 for servomotor control, all of which are routed from the cockpit to send driving current and control signals to the blade pitch angle controllers AAC for the main rotor MR 2, are introduced into the blade pitch angle controllers AAC for the main rotor MR 2 in a manner similar to the case of the wires 7 and 8 introduced into the blade pitch angle controller AAC for the main rotor MR 1.

Function of the Fifth Embodiment

Since the main propeller-rotor torque transmissions MT 1 and MT 2 are installed in the right-hand part and the left-hand part of the main wing MW, respectively, the retaining mechanisms for the main propeller-rotor torque transmissions MT 1 and MT 2 can be simplified.

All the other aspects of the functioning of the fifth embodiment are the same as the corresponding aspects of the embodiment of the first embodiment.

Sixth Embodiment

Figure 26:
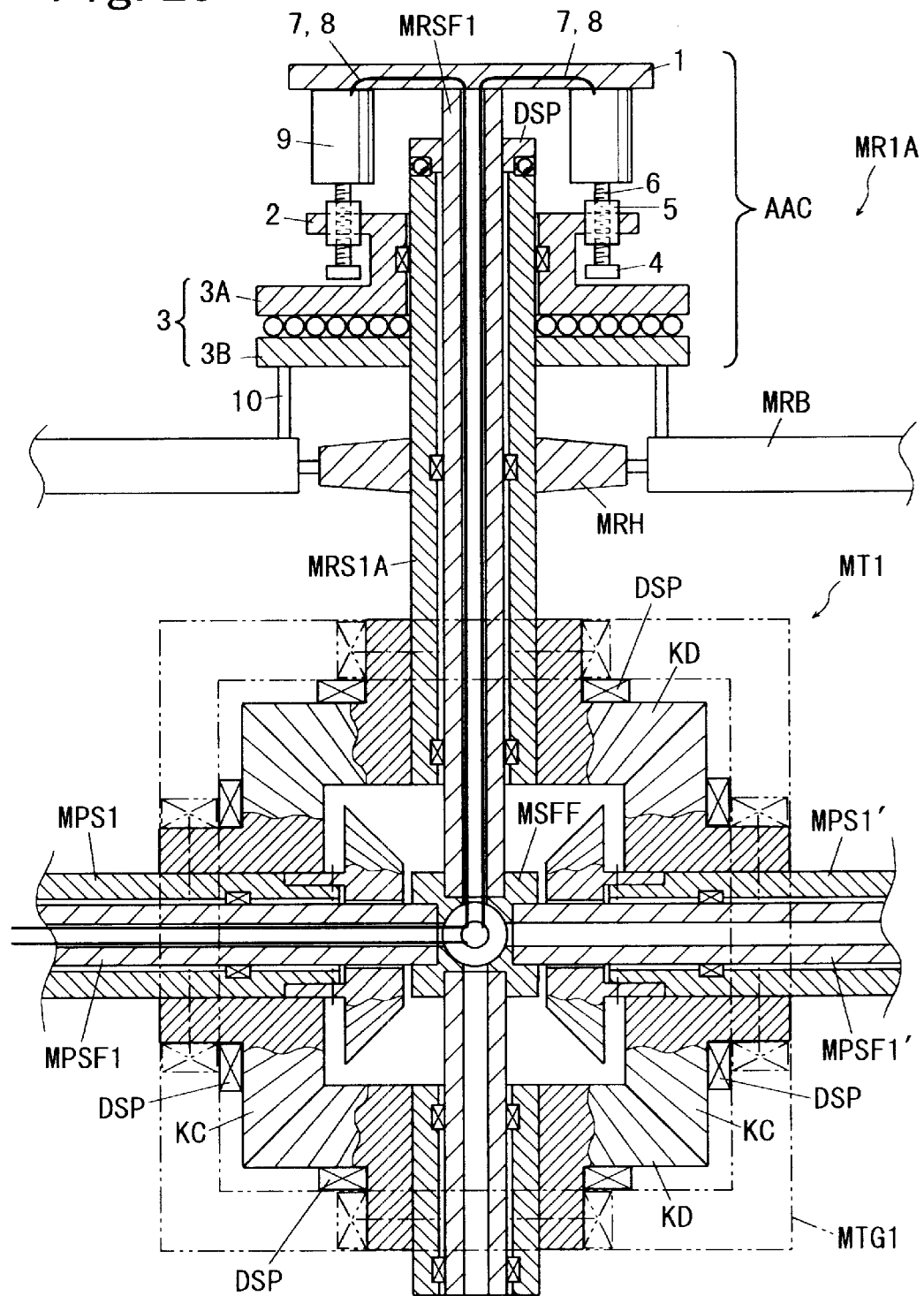
FIG. 26 is an explanatory drawing of the main propeller-rotor torque transmission MT1 and the main rotor torque shaft MRS1 of the fifth embodiment.

Reference being had to FIG. 26, the aircraft of the sixth embodiment of the present invention is explained.

In the aircraft of the first through fifth embodiments, the main rotor shaft MRS 1 shown in FIG. 5 is used as the main rotor shaft, whereas in the aircraft of the sixth embodiment, the main rotor shaft MRS 1A as shown in FIG. 26 is used as the main rotor shaft.

The differences between the main rotor shaft MRS 1 and the main rotor shaft MRS 1A are as follows.

The length of the main rotor shaft MRS 1 shown in FIG. 5 extends from the main propeller-rotor torque transmission MT 1 to the rotor head MRH.

Therefore the rotating swash plate 3B is rotated by the action of the force transmitted from the rotor head MRH via rotating scissors 12.

The length of the main rotor shaft MRS 1A shown in FIG. 26 extends from the main propeller-rotor torque transmission MT 1 to the second stand 2.

The rotating swash plate 3B and the main rotor shaft MRS 1A are linked together such that torque can be transmitted and relative axial movement is permitted.

Therefore the rotating swash plate 3B is rotated by the action of the force transmitted directly from the rotor head MRH, thus eliminating the need for the rotating scissors 12.

The structures of:

the tail rotor shaft TRS 1 as shown in FIG. 10;

the tail rotor shaft TPS 1' as shown in FIG. 13;

the tail propeller shaft TPS 1 as shown in FIG. 22; and the main propeller shaft MPS 1 as shown in FIG. 25 can be made similar to the structure of the main rotor shaft MRS 1A by extending the lengths of the respective shafts.

Functioning of the Sixth Embodiment

In the first embodiment (FIG. 5), the torque for synchronizing the rotation of the rotating swash plate 3B with the rotation of the main rotor shaft MRS 1 is supplied by the rotating scissors 12, whereas in the sixth embodiment, the above-mentioned torque is supplied by the main rotor shaft MRS 1.

In the first embodiment (FIG. 5) as well as in the sixth embodiment (FIG. 26), the force for changing rotor blade pitch angles by moving the rotating swash plate along the main rotor shaft MRS 1 is supplied by the stationary swash plate 3A.

Seventh Embodiment

Figure 27:
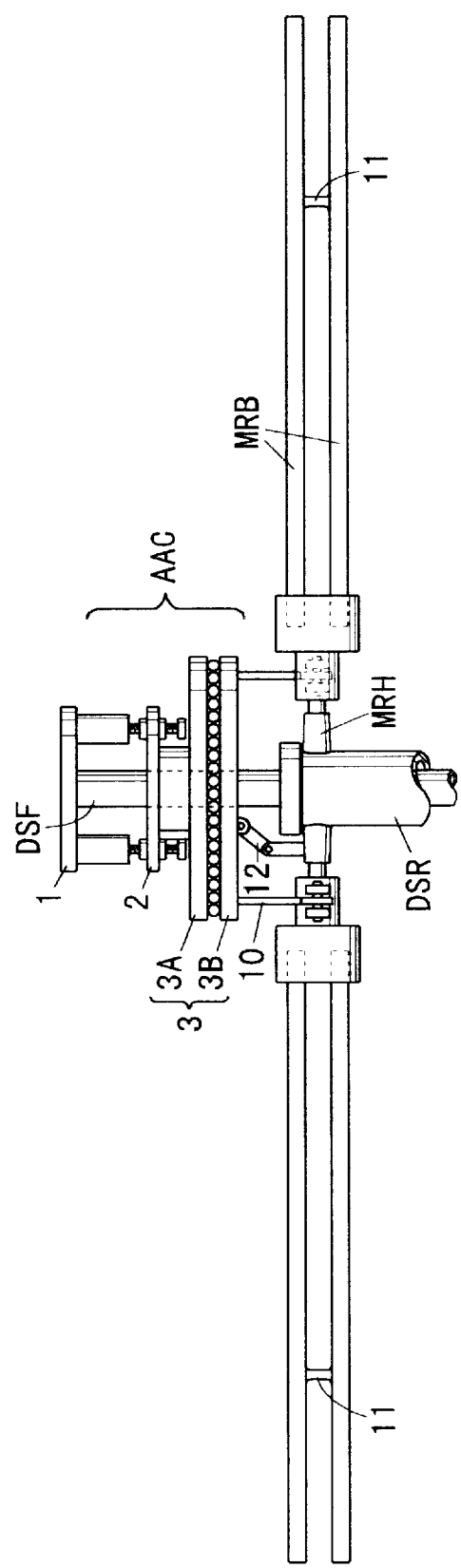
FIG. 27 is an explanatory drawing of the double blade main rotor of the seventh embodiment.
Figure 28:
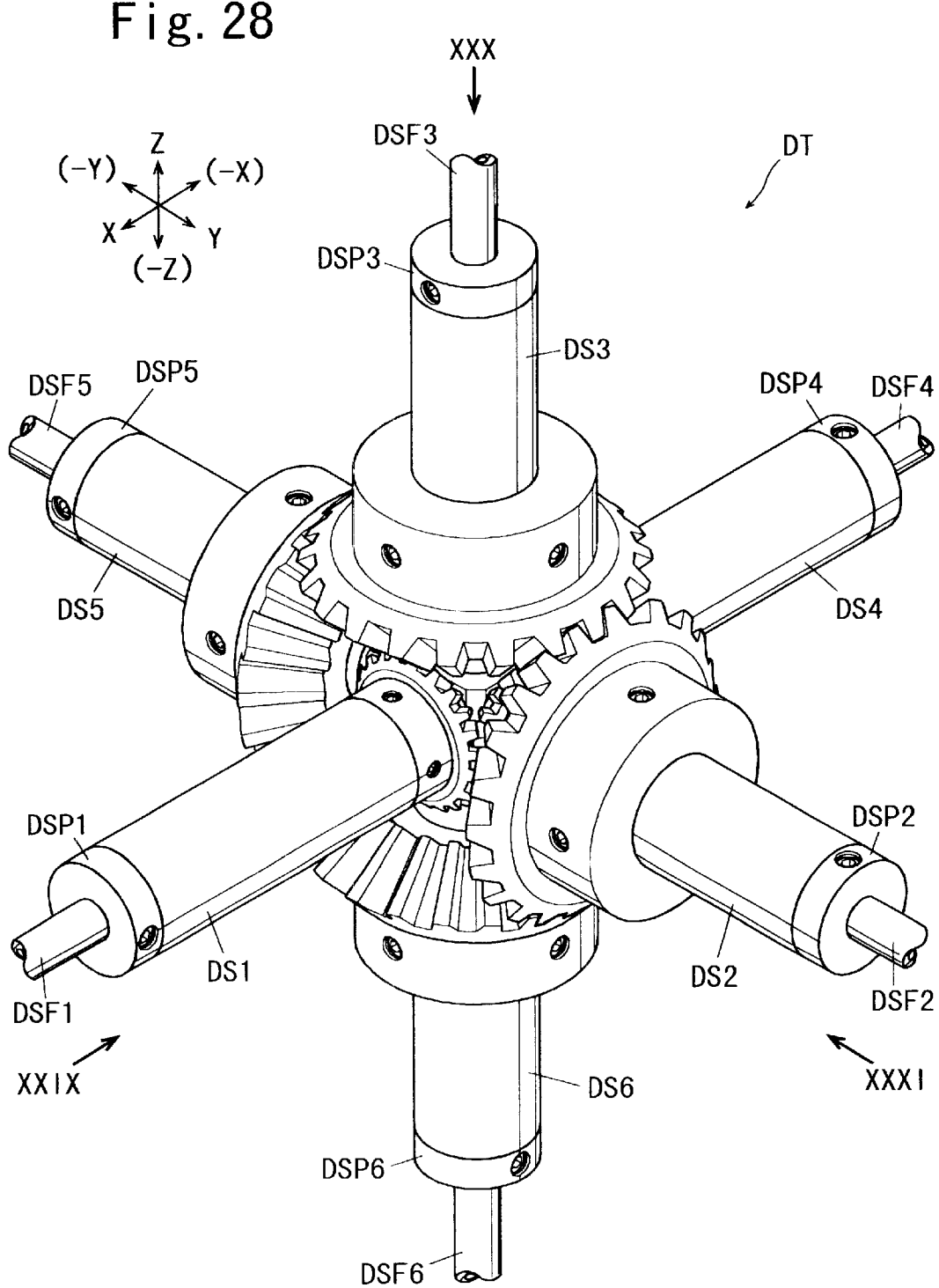
FIG. 28 is an explanatory drawing of the torque transmission (with the casing omitted for clarity) of the eighth embodiment.

Reference being had to FIG. 27, the aircraft of the seventh embodiment of the present invention is explained. In the aircraft of the seventh embodiment, bi-blade main rotors are used.

The rotor head of the seventh embodiment, which differs from the rotor head of the above-mentioned first through sixth embodiments in the following respects, is constructed similarly to the rotor head of the first through sixth embodiments in all the other respects.

The rotor head of the first through sixth embodiments has rotor blades each of which rotates in a single plane of rotation. On the other hand, in the case of the rotor head of the seventh embodiment, two planes of rotation are formed, since the pertinent rotor head has a bi-blade main rotor. A blade linkage 11 may be installed between an upper blade and a lower blade.

The rotor head of the seventh embodiment may be used on the aircraft of the first through sixth embodiments.

Functioning of the Seventh Embodiment

Since the number of blades can be increased on account of the bi-blade main rotor, a great lift can be produced.

Therefore the radius of the plane of rotation can be decreased and the length of the blade can be diminished.

Eighth Embodiment

Reference being had to FIGS. 28 through 32, the torque transmission (with the casing omitted for clarity) of the eighth embodiment of the present invention is explained.

Figure 29:
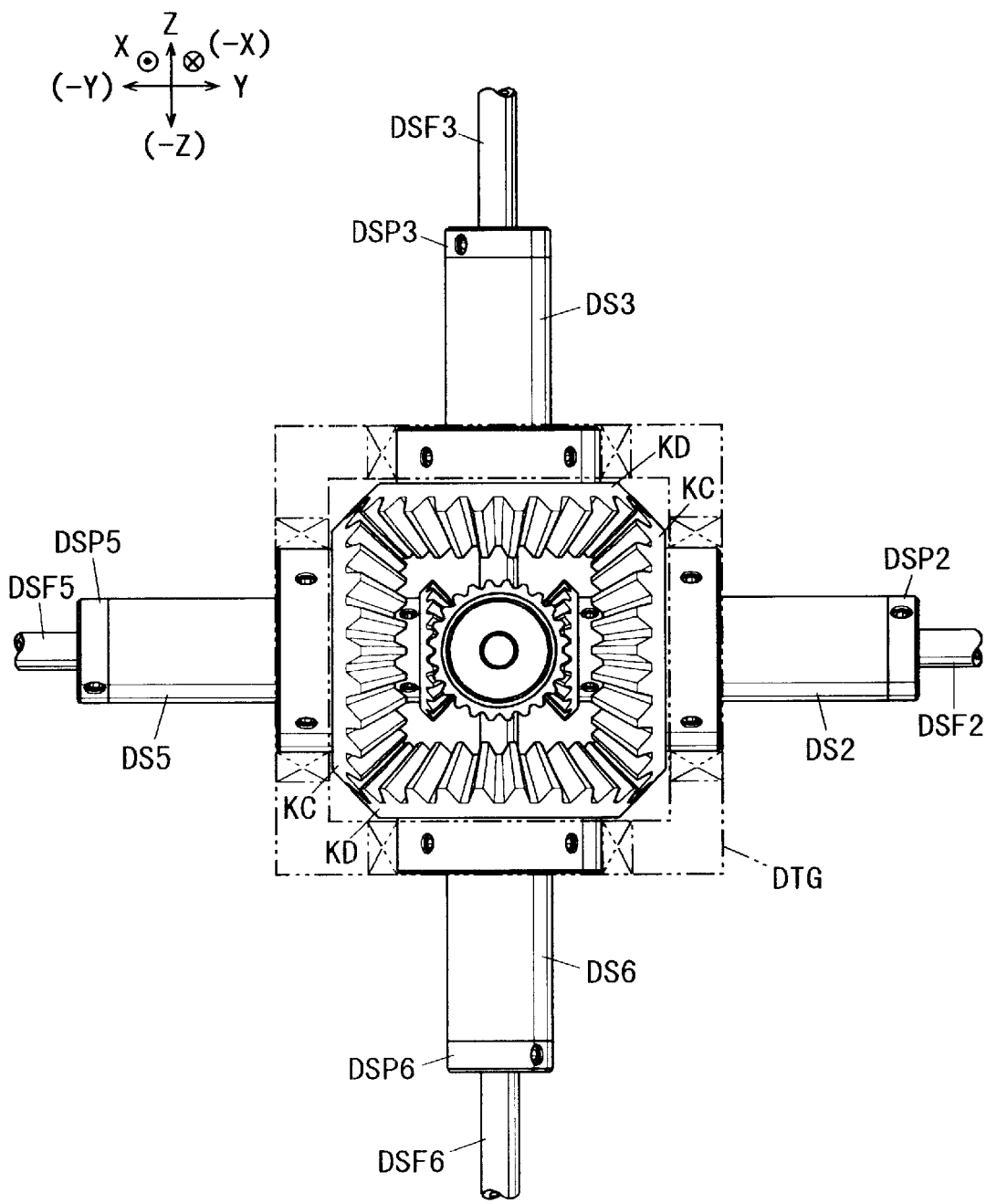
FIG. 29 is a drawing of FIG. 28 as viewed in the direction of the arrow XXIX.
Figure 30:
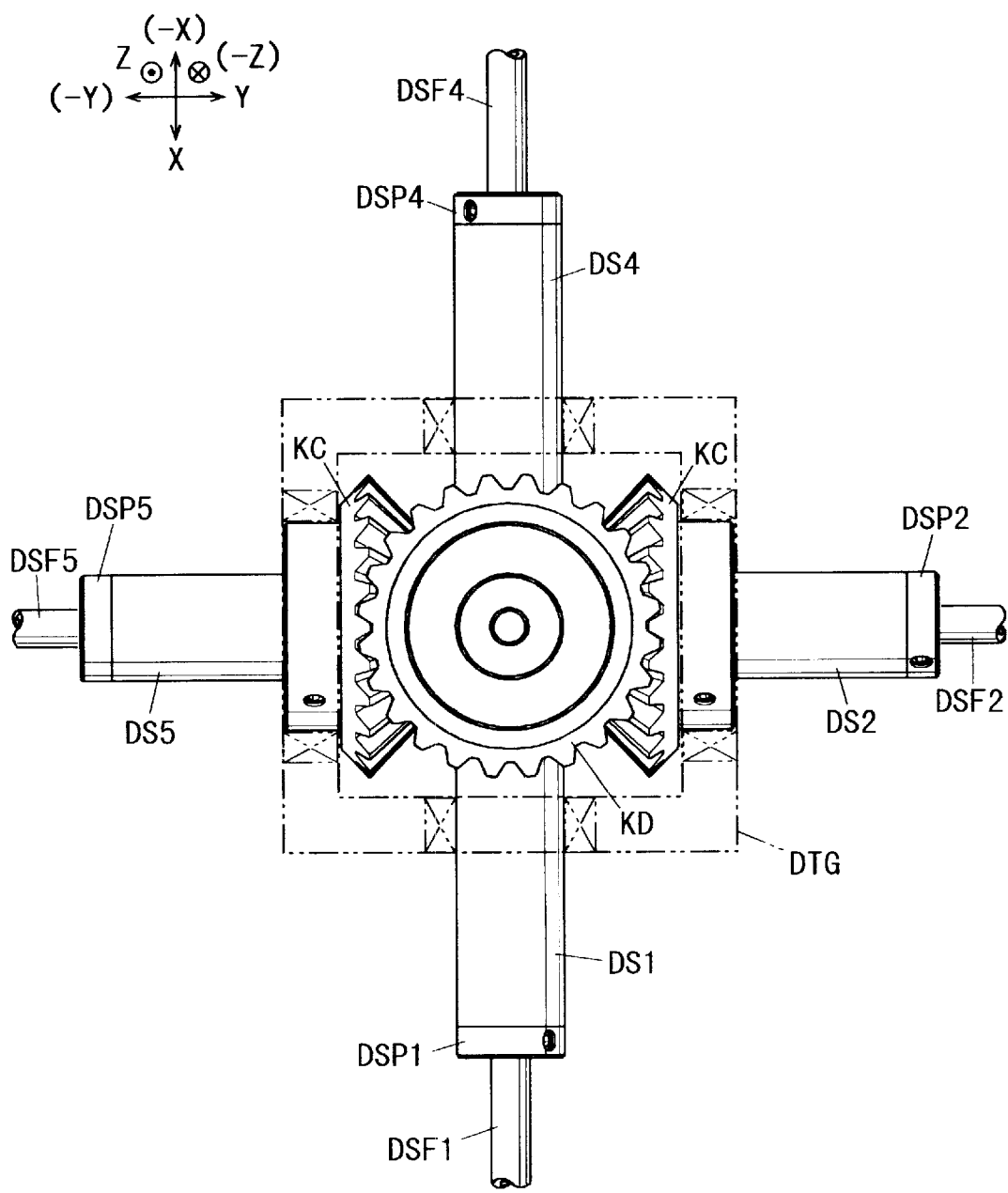
FIG. 30 is a drawing of FIG. 28 as viewed in the direction of the arrow XXX.
Figure 31:
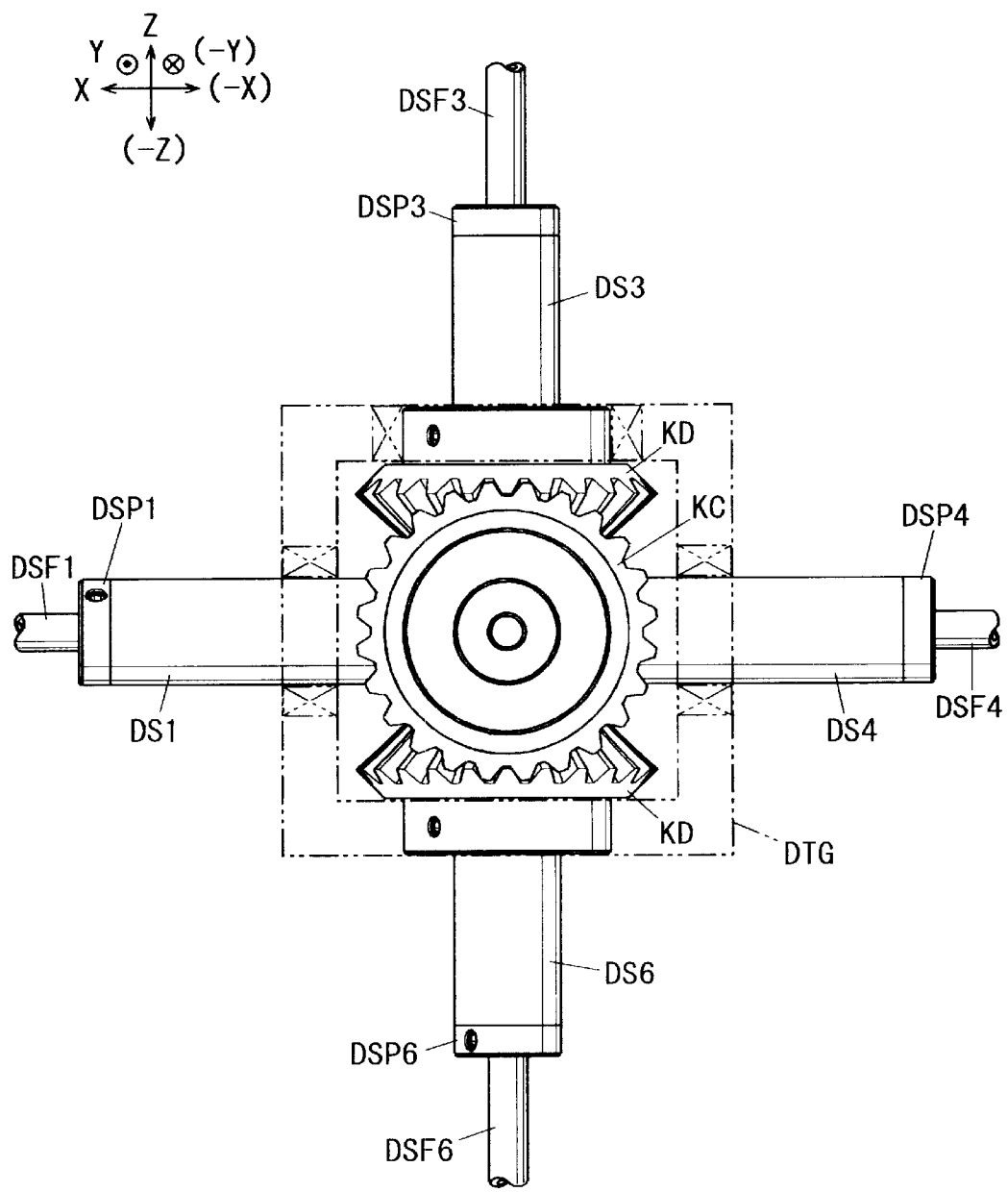
FIG. 31 is a drawing of FIG. 28 as viewed in the direction of the arrow XXXI.
Figure 32:
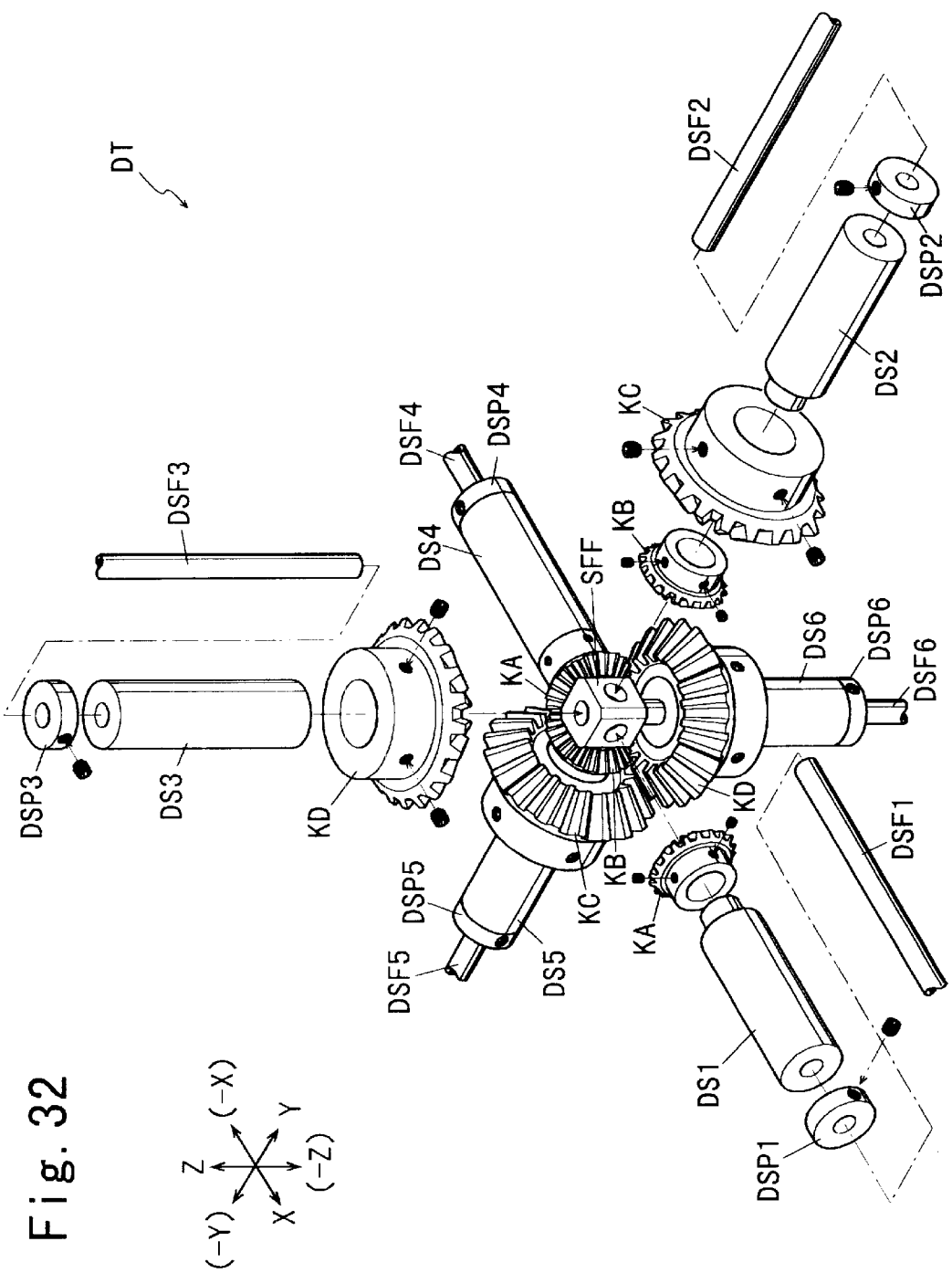
FIG. 32 is a cutaway drawing of the torque transmission shown in FIG. 28.

The two-dot chain lines in FIGS. 29 through 31 denote the casing for the torque transmission.

For the purpose of facilitating the understanding of the following explanation, a rectangular coordinate system is used on explanatory drawings of the torque transmission in FIGS. 28 through 32 such that:

the direction of a first drive shaft DS 1 is referred to as the direction of the x-axis;

the direction of a second drive shaft DS 2 is referred to as the direction of the y-axis;

the direction of a third drive shaft DS 3 is referred to as the direction of the z-axis;

the direction of a fourth drive shaft DS 4 is referred to as the direction of the −x-axis;

the direction of a fifth drive shaft DS 5 is referred to as the direction of the −y-axis; and the direction of a sixth drive shaft DS 6 is referred to as the direction of the −z-axis;

In FIG. 28 through 32:

a symbol consisting of a circle ○ with a dot · concentrically placed inside designates an arrow directed from the far side toward the near side; and a symbol consisting of a circle ○ with a cross × concentrically placed inside designates an arrow directed from the near side toward the far side.

As shown in FIGS. 28 through 32, on condition that the three axes which intersect one another at the origin ○ at right angles to one another are termed the x-axis, y-axis, and the z-axis, the torque transmission of the present invention comprises:

six hollow drive shafts DS 1, DS 2, DS 3, DS 4, DS 5, and DS 6, all of whose axes of rotation extend in the directions of the x-axis, the y-axis, the z-axis, the −x-axis, −y-axis, and the −z-axis, respectively;

six hollow drive shaft supports DSF 1, DSF 2, DSF 3, DSF 4, DS F5, and DSF6, all of which are installed inside the above-mentioned drive shafts DS 1, DS 2, DS 3, DS 4, DS 5, and DS 6, respectively;

a shaft support coupler SFF whereto is fixed one end of each of the above-mentioned drive shaft supports DSF 1 through DSF 6; and six stops DSP one of which is provided on each of the above-mentioned drive shaft supports DSF 1 through DSF 6.

Bearings are installed at locations where bearings are required.

In the following explanation, it is assumed that torque and power are supplied by one of the drive shafts DS 1 through DS 6.

The above-mentioned drive shafts DS 1 through DS 6 are supported via bearings by:

the drive shaft supports DSF 1 through DSF 6, respectively, which are located in the hollow portions of the drive shafts DS 1 through DS 6, respectively; and the casing TGD for the torque transmission DT.

Torque and power are transmitted by a total six bevel gears one or two of which are located at one end of each of the drive shafts DS 1 through DS 6.

Each of the stops DSP is located between each of the other ends of the above-mentioned drive shafts DS 1 through DS 6 and each of the drive shaft supports DSF 1 through DSF 6, respectively.

One end of each of the above-mentioned drive shaft supports is fixed by means of the shaft support coupler SFF.

Any pair of drive shaft supports whose axes of rotation constitute the x-axis, the y-axis, or the z-axis may be integrated to form a single drive shaft support which passes through the shaft support coupler SFF.

Wires and the like can be routed through the hollow portions of the above- mentioned hollow drive shaft supports DSF 1 through DSF 6.

A first bevel gear KA (number of teeth: a), is the only bevel gear that is installed on each of the first drive shaft DS 1 and the fourth drive shaft DS 4, both of which rotate around the x-axis.

A fourth bevel gear KD (number of teeth: d), is the only bevel gear that is installed on each of the third drive shaft DS 3 and the sixth drive shaft DS 6, both of which rotate around the z-axis.

A second bevel gear KB (number of teeth: b), which engages with the first bevel gear KA (number of teeth: a); and a third bevel gear KC (number of teeth: c), which engages with the fourth bevel gear KD (number of teeth: d) are the only bevel gears that are installed on each of the second drive shaft DS 2 and the fifth drive shaft DS 5.

In this case, the layout is such that:

the third bevel gear KC, which is installed on each of the second drive shaft DS 2 and the fifth drive shaft DS 5, is located at a greater distance from the shaft support coupler SFF than is the second bevel gear KB, which also is installed on each of the second drive shaft DS 2 and the fifth drive shaft DS 5; and the circular pitch of the above-mentioned third bevel gear KC is designed to be larger than the circular pitch of above-mentioned second bevel gear KB; thereby ensuring that:

the first bevel gear KA engages with the second bevel gear KB only; and the third bevel gear KC engages with the fourth bevel gear KD only. From the above it follows that:

the first drive shaft DS 1 has one bevel gear KA;

the second drive shaft DS 2 has one bevel gear KB and one bevel gear KC;

the third drive shaft DS 3 has one bevel gear KD;

the fourth drive shaft DS 4 has one bevel gear KA;

the fifth drive shaft DS 5 has one bevel gear KB and one bevel gear KC; and the sixth drive shaft DS 6 has one bevel gear KD.

Therefore if the first drive shaft DS 1 is used as the input shaft, then the torque and the power which are inputted into the first drive shaft from the engine via the engine gearbox are transmitted to the second through sixth drive shafts as follows.

(1) Transmission of Power by the Bevel Gears KA and KB

The torque and the power which are transmitted to the bevel gear KA installed on the first drive shaft DS 1 are transmitted to the second drive shaft DS 2 via the bevel gear KB which is installed on the second drive shaft DS 2 and which engages with the bevel gear KA installed on the first drive shaft DS 1.

Power and torque are transmitted from the first drive shaft DS 1 to the second drive shaft DS 2 as follows.

The torque and the power which are transmitted to the bevel gear KA installed on the first drive shaft DS 1 are transmitted to the second drive shaft DS 2 via the bevel gear KB which is installed on the second drive shaft DS 2 and which engages with the bevel gear KA installed on the first drive shaft DS 1. (See FIG. 32.)

Power and torque are transmitted from the first drive shaft DS 1 to the fifth drive shaft DS 5 as follows.

The torque and the power which are transmitted to the bevel gear KA installed on the first drive shaft DS 1 are transmitted to the fifth drive shaft DS 5 via the bevel gear KB which is installed on the fifth drive shaft DS 5 and which engages with the bevel gear KA installed on the first drive shaft DS 1. (See FIG. 32.)

Power and torque are transmitted from the second drive shaft DS 2 to the fourth drive shaft DS 4 as follows.

The torque and the power which are transmitted to the second drive shaft DS 2 are transmitted to the fourth drive shaft DS 4 via the bevel gear KA which is installed on the fourth drive shaft DS 4 and which engages with the bevel gear KB installed on the second drive shaft DS 2. (See FIG. 32.)

Power and torque are transmitted from the fifth drive shaft DS 5 to the fourth drive shaft DS 4 as follows.

The torque and the power which are transmitted to the fifth drive shaft DS 5 are transmitted to the fourth drive shaft DS 4 via the bevel gear KA which is installed on the fourth drive shaft DS 4 and which engages with the bevel gear KB installed on the fifth drive shaft DS 5. (See FIG. 32.)

(2) Transmission of Power by the Bevel Gears KC and KD

Power and torque are transmitted from the second drive shaft DS 2 to the third drive shaft DS 3 as follows.

The torque and the power which are transmitted to the second drive shaft DS 2 are transmitted to the third drive shaft DS 3 via the bevel gear KD which is installed on the third drive shaft DS 3 and which engages with the bevel gear KC installed on the second drive shaft DS 2. (See FIG. 32.)

Power and torque are transmitted from the second drive shaft DS 2 to the sixth drive shaft DS 6 as follows.

The torque and the power which are transmitted to the second drive shaft DS 2 are transmitted to the sixth drive shaft DS 6 via the bevel gear KD which is installed on the sixth drive shaft DS 6 and which engages with the bevel gear KC installed on the second drive shaft DS 2. (See FIG. 32.)

Power and torque are transmitted from the first fifth shaft DS 5 to the third drive shaft DS 3 as follows.

The torque and the power which are transmitted to the fifth drive shaft DS 5 are transmitted to the third drive shaft DS 3 via the bevel gear KD which is installed on the third drive shaft DS 3 and which engages with the bevel gear KC installed on the fifth drive shaft DS 5. (See FIG. 32.)

Power and torque are transmitted from the fifth drive shaft DS 5 to the sixth drive shaft DS 6 as follows.

The torque and the power which are transmitted to the fifth drive shaft DS 5 are transmitted to the sixth drive shaft DS 6 via the bevel gear KD which is installed on the third drive shaft DS 6 and which engages with the bevel gear KC installed on the sixth drive shaft DS 6. (See FIG. 32.)

Functioning of the Fifth Embodiment

On condition that:
the number of teeth of the bevel gear KA is denoted by the letter a;
the number of teeth of the bevel gear KB is denoted by the letter b;
the number of teeth of the bevel gear KC is denoted by the letter c;
the number of teeth of the bevel gear KD is denoted by the letter d;
the rotational speed of a drive shaft rotating counterclockwise is preceded by the positive sign +; and the rotational speed of a drive shaft rotating clockwise is preceded by the negative sign–: it follows that:
if the rotational speed transmitted to the first drive shaft DS 1 is expressed by +N (rpm), then:
the rotational speed transmitted to the second drive shaft DS 2 is –N a/b (rpm);
the rotational speed transmitted to the third drive shaft DS 3 is +N a c/b d (rpm);
the rotational speed transmitted to the fourth drive shaft DS 4 is –N (rpm);
the rotational speed transmitted to the fifth drive shaft DS 5 is +N a/b (rpm); and
the rotational speed transmitted to the sixth drive shaft DS 6 is –N a c/b d (rpm).

Advantage of the Eight Embodiment

The torque transmission of the eighth invention offers the following advantages.

(a) Around the x-axis, the first drive shaft DS 1 and the fourth drive shaft DS 4 can rotate at the same speed as each other and in the opposite direction to each other; around the y-axis, the second drive shaft DS 2 and the fifth drive shaft DS 5 can rotate at the same speed as each other and in the opposite direction to each other; and around the z-axis, the third drive shaft DS 3 and the six drive shaft DS 6 can rotate at the same speed as each other and in the opposite direction to each other (b) If the numbers of teeth of the bevel gears are chosen pertinently, then the rotational speeds of the drive shafts in the direction of the x-axis, the y-axis, and the z-axis can be made different from one another.

(c) Therefore if the torque transmission DT of the present invention is used on an aircraft wherein the plane of rotation of any propeller does not intermesh with the plane of rotation of any rotor, then the rotational speed of any propeller can be made different from the rotational speed of any rotor.

FIRST PRACTICAL EXAMPLE

The first practical example (1) shown in FIG. 33 pertains to a case where a torque transmission of the present invention is used on an aircraft, wherein one input shaft, two propeller shafts, and one rotor shaft are provided.

In the above-mentioned practical example:
the drive shaft DS 1 serves as an input shaft;
the drive shafts DS 2 and DS 5 serve as propeller shafts; and
the drive shaft DS 3 serves as a rotor shaft.

In the above-mentioned torque transmission, any drive shaft support for an idling shaft, which is not used either as an input shaft or as an output shaft, may be utilized as an intake for wires for sending driving current and control signals to the pitch angle controller AAC for blades of propellers; or a shaft whereto the shaft support coupler SFF is fixed

SECOND PRACTICAL EXAMPLE

The second practical example (2) shown in FIG. 34 pertains to another case where a torque transmission of the present invention is used as a propeller-rotor torque transmission for an aircraft, wherein one input shaft, two propeller shafts, and two rotor shafts are provided. In the above-mentioned practical example:
the drive shaft DS 1 serves as an input shaft;
the drive shafts DS 2 and DS 5, both of which are used as output shafts, serve as propeller shafts;
the drive shafts DS 3 and DS 6 serve as rotor shafts.

The drive shafts DS 2 and DS 5 function as a pair of propeller shafts both of which rotate at the same speed as each other and in the opposite direction to each other.

The drive shafts DS 3 and DS 6 rotate at the same speed as each other yet in the opposite direction to each other.

MODIFICATIONS

The present invention is not limited to the embodiments described above, but various modifications may be made within the scope of the claims put forward in the present invention. Examples of modifications to the present invention are explained below.

First Modification

In an aircraft wherein no main propeller intermeshes with any main rotor:

a transmission may be provided between a main propeller-rotor torque transmission and a main rotor; and another transmission may be provided between the above-mentioned main propeller-rotor torque transmission and a main propeller. (Illustration is omitted.)

During forward flight, by means of the above-mentioned transmissions, rotational speed of the main propellers may be increased and the rotational speed of main rotors may be decreased, thereby enhancing high-speed performance.

During hovering, by means of the above-mentioned transmissions, rotational speed of main rotors may be increased and the rotational speed of main propellers may be decreased, thereby enhancing hovering performance.

In cases where no tail propeller intermeshes with any tail rotor:

a transmission may be provided between a tail propeller-rotor torque transmission and a tail rotor; and another transmission may be provided between the above-mentioned tail propeller-rotor torque transmission and a tail propeller. (Illustration is omitted.)

Second Modification

In an aircraft wherein no main propeller intermeshes with any main rotor:

a clutch may be provided between a main propeller-rotor torque transmission and a main rotor; and another clutch may be provided between the above-mentioned main propeller-rotor torque transmission and a main propeller.

During forward flight, the rotation of main rotors may be stopped by means of the above-mentioned clutch, thereby enhancing high-speed performance.

During hovering, the rotation of main propellers may be stopped by means of the above-mentioned clutch, thereby enhancing hovering performance.

In cases where no tail propeller intermeshes with any tail rotor:

a clutch may be provided between a tail propeller-rotor torque transmission and a tail propeller: and another clutch may be provided between the above-mentioned tail propeller-rotor torque transmission and a tail rotor. (Illustration is omitted.)

a transmission and a clutch may be provided between a main propeller-rotor torque transmission and a main rotor. (Illustration is omitted.)

Third Modification

In an aircraft wherein no main propeller intermeshes with any main rotor:

another transmission and another clutch may be provided between the above-mentioned main propeller-rotor torque transmission and a main propeller. (Illustration is omitted.)

During forward flight, the rotation of main propellers may be increased by means of the above-mentioned transmission and the rotation of main rotors may be stopped by means of the above-mentioned clutch, thereby greatly enhancing high-speed performance.

During hovering, the rotation of main rotors may be increased by means of the above-mentioned transmission, and the rotation of main propellers may be stopped by means of the above-mentioned clutch, thereby greatly enhancing hovering performance.

In cases where no tail propeller intermeshes with any tail rotor:

a transmission and a clutch may be provided between a tail propeller-rotor torque transmission and a tail rotor; and another transmission and another clutch may be provided between the above-mentioned tail propeller-rotor torque transmission and tail propellers.

What is claimed is:

1. An aircraft comprising:
   (a) an airframe having
      (1) a fuselage extending longitudinally,
      (2) a set of fixed wings consisting of a main wing and a horizontal tail wing both of which are connected to said fuselage at two locations longitudinally apart from each other and both of which extend laterally and are capable of producing lifts during forward flight, and a vertical tail wing,
      (3) two ailerons one of which is installed on the right-hand section of said main wing and the rest of which is installed in the left-hand section of said main wing,
      (4) two elevators one of which is installed on the right-hand section of the above mentioned horizontal tail wing and the rest of which is installed in the left-hand section of the above mentioned horizontal tail wing, and
      (5) a rudder installed on the above mentioned vertical tail wing;
   (b) a propeller-rotor torque transmission having
      (1) a shaft support coupler wherein
         one end each of a propeller shaft support and a rotor shaft support both of which lie at right angles to each other,
         and one end of an input shaft which lies at right angles to said propeller shaft support and to said rotor shaft support or which lies coaxially with either said propeller shaft support or with said rotor shaft support,
         are coupled together in such a way as to preclude rotation,
      (2) a cylindrical input shaft which is installed in such a way as to permit rotation around said input shaft support,
      (3) a cylindrical propeller shaft which is installed in such a way as to permit rotation around said propeller shaft support and on which a variable pitch propeller for producing a propelling force is installed,
      (4) a cylindrical rotor shaft which is installed in such a way as to permit rotation around said rotor shaft support and on which is installed a rotor head that supports a rotor blade for producing a lift such that only the collective pitch is variable, and
      (5) a bevel gear which transmits the rotation of said cylindrical input shaft (hereinafter referred to as an input shaft), simultaneously to said cylindrical propeller shaft (hereinafter referred to as a propeller shaft), and to said cylindrical rotor shaft (hereinafter referred to as a rotor shaft);
   (c) an engine gearbox which supplies said input shaft with rotational motive power; and (d) a flight control system having
   (1) a propeller collective pitch controller which controls the pitch angle of said variable pitch propeller,
   (2) a rotor collective pitch controller which controls the collective pitch of said rotor blade,
   (3) an engine power controller which controls the output of said engine gearbox for the purpose of changing the rotational speed of said input shaft, and
   (4) a directional (yaw) control system which controls the deflection angles of said ailerons and said rudder to control the flight direction of the aircraft during forward flight.

2. An aircraft according to claim 1 wherein having:
(a) two propeller-rotor torque transmissions, one of which is located in the right-hand section of said aircraft, and, another propeller-rotor torque transmission is located in the right-hand section of said aircraft; and
(b) a directional (yaw) control system serving to independently control the pitch angles of two units of said variable pitch propellers one of which is located in the right-hand section of said aircraft and the rest of which is located in the left-hand section of said aircraft, thereby controlling the flight direction of said aircraft.

3. An aircraft according to claim 2 wherein having
a first propeller-rotor torque transmission and a second propeller-rotor torque transmission each of which has a rotor shaft and two propeller shafts rotating at the same speed as said rotor shafts.

4. An aircraft according to claim 1 wherein a bi-blade rotor is used in lieu of said rotor having single blades, or a bi-blade variable pitch propeller is used in lieu of said variable pitch propeller having a single blade.

5. A torque transmission comprising:
(a) a shaft support coupler whereto the end of each of a first drive shaft supports and a second drive shaft support, both of which lie at right angles to each other, and the end of a third drive shaft support are linked in such a way as to preclude rotation,
(b) a third drive shaft support which lies at right angles to said first and second drive shaft support, or lies coaxially with said first or second drive shaft support, and is located on the other side of said shaft support coupler;
(c) a first drive shaft, a second drive shaft, and a third drive shaft, all of which are cylindrical and are installed around said first through third drive shaft supports, respectively; and
(d) a torque transmission bevel gear train wherein at least one bevel gear is installed on each of said first through third drive shafts such that the rotation of one of said first through third drive shafts is transmitted simultaneously to the other drive shafts.

6. A torque transmission according to claim 5 having:
a torque transmission bevel gear train wherein
   a first small bevel gear and a first large bevel gear are installed on one of said first through third drive shafts;
   a second small bevel gear is installed on one of the drive shafts on which neither said first small bevel gear nor said first large bevel gear is installed; and
   a second large bevel gear is installed on the drive shaft on which no other drive bevel gear is installed; such that
   said first small bevel gear and said second small bevel gear mesh with each other; and said first large bevel gear and said second large bevel gear mesh with each other.

7. A torque transmission according to claim 5 having:
said three drive shafts all of which lie at right angles to one another.

8. A torque transmission according to claim 5 having:
said three drive shafts all of which lie on a plane.

9. A torque transmission according to claim 5 having:
(a) a fourth drive shaft support which lies coaxially with one of the three drive shafts consisting of said first through third drive shafts and is linked to the opposite side of said shaft support coupler in such a way as to preclude rotation; and
(b) a fourth drive shaft which is installed on said fourth drive shaft support in such a way as to permit rotation and on which is installed a bevel gear that meshes with a bevel gear installed on one of the drive shafts each mounted on one of two drive shaft supports consisting of said three drive shaft supports less the drive shaft support lying coaxially with said fourth drive shaft support.

10. A torque transmission according to claim 9 having:
(a) a fifth drive shaft support which lies coaxially with one of the four drive shafts consisting of said first through fourth drive shafts and is linked to the opposite side of said shaft support coupler in such a way as to preclude rotation; and
(b) a fifth drive shaft which is installed on said fifth drive shaft support in such a way as to permit rotation and on which is installed a bevel gear that meshes with a bevel gear installed on one of the drive shafts each mounted on one of three drive shaft supports consisting of said four drive shaft supports less the drive shaft support lying coaxially with said fifth drive shaft support.

11. A torque transmission according to claim 10 having:
(a) a sixth drive shaft support which lies coaxially with one of the five drive shafts consisting of said first through fifth drive shafts and is linked to the opposite side of said shaft support coupler in such a way as to preclude rotation; and
(b) a sixth drive shaft which is installed on said sixth drive shaft support in such a way as to permit rotation and on which is installed a bevel gear that meshes with a bevel gear installed on one of the drive shafts each mounted on one of four drive shaft supports consisting of said five drive shaft supports less the drive shaft support lying coaxially with said sixth drive shaft support.

* * * * *